(12) United States Patent
Seiler

(10) Patent No.: US 11,138,800 B1
(45) Date of Patent: Oct. 5, 2021

(54) OPTIMIZATIONS TO REDUCE MULTI-CHANNEL RAY CASTING FOR COLOR SAMPLING

(71) Applicant: Facebook Technologies, LLC, Menlo Park, CA (US)

(72) Inventor: Larry Seiler, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/668,670

(22) Filed: Oct. 30, 2019

Related U.S. Application Data

(60) Provisional application No. 62/753,634, filed on Oct. 31, 2018.

(51) Int. Cl.
| | |
|---|---|
| G06T 19/00 | (2011.01) |
| G06T 15/06 | (2011.01) |
| G06T 15/00 | (2011.01) |
| G02B 27/01 | (2006.01) |
| G06T 7/90 | (2017.01) |

(52) U.S. Cl.
CPC ........ G06T 19/006 (2013.01); G02B 27/0172 (2013.01); G06T 7/90 (2017.01); G06T 15/005 (2013.01); G06T 15/06 (2013.01); *G02B 2027/011* (2013.01)

(58) Field of Classification Search
CPC ....... G06T 19/006; G06T 7/90; G06T 15/005; G06T 15/06; G02B 27/0172; G02B 2027/013
See application file for complete search history.

(56) References Cited

U.S. PATENT DOCUMENTS

| | | | | |
|---|---|---|---|---|
| 5,369,450 A | * | 11/1994 | Haseltine | H04N 3/2335 |
| | | | | 315/368.12 |
| 6,536,907 B1 | * | 3/2003 | Towner | H04N 5/335 |
| | | | | 348/745 |

(Continued)

OTHER PUBLICATIONS

John Mallon and Paul F. Whelan, "Calibration and Removal of Lateral Chromatic Aberration in Images," Pattern Recognition Letters 28 (2007) p. 135-135. (Year: 2007).*

(Continued)

*Primary Examiner* — Sing-Wai Wu
(74) *Attorney, Agent, or Firm* — Baker Botts L.L.P.

(57) ABSTRACT

In one embodiment, a method includes accessing a first distortion definition for a first color component of a collection of pixels and a second distortion definition for a second color component of the collection of pixels; casting, from a viewpoint in a 3D space, a first bundle of rays for the first color component in accordance with the first distortion definition; computing a first set of intersection locations between the cast first bundle of rays and an object in the 3D space; determining, based on the first and second distortion definitions, that a difference between distortions of the first and second color components satisfies a predetermined threshold; estimating, using the first set of intersection locations, a second set of intersection locations on the object for the second color component; and determining color values for the collection of pixels based on the first and second sets of intersection locations.

20 Claims, 14 Drawing Sheets

(56) References Cited

U.S. PATENT DOCUMENTS

| | | | |
|---|---|---|---|
| 7,660,358 B2 * | 2/2010 | Pang | G10L 19/04 375/242 |
| 2004/0217956 A1 | 11/2004 | Besl | |
| 2005/0146522 A1 | 7/2005 | Maillot | |
| 2007/0024615 A1 | 2/2007 | Keller | |
| 2009/0049452 A1 | 2/2009 | Kriegel | |
| 2010/0188396 A1 * | 7/2010 | Mejdrich | G06T 17/005 345/419 |
| 2013/0244782 A1 | 9/2013 | Newcombe | |
| 2014/0340390 A1 | 11/2014 | Lanman | |
| 2015/0379697 A1 | 12/2015 | Pohl | |
| 2016/0028975 A1 * | 1/2016 | Lee | H04N 19/463 348/251 |
| 2016/0260245 A1 | 9/2016 | Decell | |
| 2016/0314564 A1 | 10/2016 | Jones | |
| 2017/0263006 A1 | 9/2017 | Hunt | |
| 2017/0329136 A1 | 11/2017 | Bates | |
| 2018/0033191 A1 | 2/2018 | Mendez | |
| 2018/0190013 A1 | 7/2018 | Wald | |
| 2019/0000588 A1 | 1/2019 | Choudhry | |
| 2019/0073820 A1 | 3/2019 | Barron | |
| 2019/0096023 A1 | 3/2019 | Diefenbaugh | |
| 2019/0096119 A1 | 3/2019 | Petkov | |
| 2019/0289284 A1 | 9/2019 | Smith | |
| 2020/0380762 A1 | 12/2020 | Karafin | |

OTHER PUBLICATIONS

Livny, et al., A GPU persistent grid mapping for terrain rendering, Visual Comput (2008) 24:139-153.

Murphy, et al., Hybrid image/Model-Based Gaze-Contingent Rendering, ACM Transactions on Applied Perception, vol. 5, No. 4, Article 22, 21 pages, Jan. 2009.

Muller, et al., Screen Space Meshes, Eurographics/ACM SIGGRAPH Symposium on Computer Animation, 28 pages, 2007.

* cited by examiner

OPTIMIZATIONS TO REDUCE MULTI-CHANNEL RAY CASTING FOR COLOR SAMPLING

PRIORITY

This application claims the benefit, under 35 U.S.C. § 119(e), of U.S. Provisional Patent Application No. 62/753,634, filed 31 Oct. 2018, which is incorporated herein by reference.

TECHNICAL FIELD

This disclosure generally relates to computer graphics, and more particularly to graphics rendering methodologies and optimizations for generating artificial reality, such as virtual reality and augmented reality.

BACKGROUND

Computer graphics, in general, are visual scenes created using computers. Three-dimensional (3D) computer graphics provide users with views of 3D objects from particular viewpoints. Each object in a 3D scene (e.g., a teapot, house, person, etc.) may be defined in a 3D modeling space using primitive geometries. For example, a cylindrical object may be modeled using a cylindrical tube and top and bottom circular lids. The cylindrical tube and the circular lids may each be represented by a network or mesh of smaller polygons (e.g., triangles). Each polygon may, in turn, be stored based on the coordinates of their respective vertices in the 3D modeling space.

Even though 3D objects in computer graphics may be modeled in three dimensions, they are conventionally presented to viewers through rectangular two-dimensional (2D) displays, such as computer or television monitors. Due to limitations of the visual perception system of humans, humans expect to perceive the world from roughly the same vantage point at any instant. In other words, humans expect that certain portions of a 3D object would be visible and other portions would be hidden from view. Thus, for each 3D scene, a computer-graphics system may only need to render portions of the scene that are visible to the user and not the rest. This allows the system to drastically reduce the amount of computation needed.

Raycasting is a technique used for determining object visibility in a 3D scene. Conventionally, virtual rays are uniformly cast from a virtual pin-hole camera through every pixel of a virtual rectangular screen into the 3D world to determine what is visible (e.g., based on what portions of 3D objects the rays hit). However, this assumes that uniform ray distribution is reasonable when computing primary visibility from a virtual pinhole camera for conventional, rectangular display technologies with a limited field of view (e.g., computer monitors and phone displays). This assumption, however, does not hold for non-pinhole virtual cameras that more accurately represent real optical sensors. Moreover, current VR and AR viewing optics (e.g., as integrated within a head-mounted display), provide a curved, non-uniform viewing surface rather than conventional rectangular displays. As a result, conventional rendering techniques, which are designed and optimized based on the aforementioned assumptions, are computationally inefficient, produce sub-optimal renderings, and lack the flexibility to render scenes in artificial reality.

SUMMARY OF PARTICULAR EMBODIMENTS

The lens in a virtual reality (VR) or augmented reality (AR) headset is a physical lens that is subject to physical optics properties. When light from a display in the headset passes through the lens, varying degrees of chromatic aberration may occur for different wavelengths, depending on the properties (e.g., refractive index, thickness, geometry, etc.) of the portion of the lens through which the light passes. To correct for chromatic aberration, a display engine in a VR or AR headset may determine how much the red, green, and blue rays are distorted due to chromatic aberration. It may then offset color sampling positions for individual colors by a calculated amount. For example, if, relative to green, chromatic aberration causes red light to shift up by two texels and blue to shift down by two texels for rays received/cast from a particular pixel, the display engine may offset the sampling positions for red light by two texels down and may offset the sampling positions for blue light two texels up, so that when the light is observed by the user through the lens, chromatic aberration would be corrected. In other words, it may appear to the user as if no chromatic aberration has occurred. To accomplish this, particular embodiments determine individual RGB color values that should be displayed on each pixel by mapping those pixels to virtual surfaces or objects using ray casting. The rays may be cast through a distortion mesh that defines the expected distortion caused by chromatic aberration. This is done to determine the offset of RGB color rays. Finally, particular embodiments perform computational and time-saving optimizations to reduce the number of rays that need to be cast.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
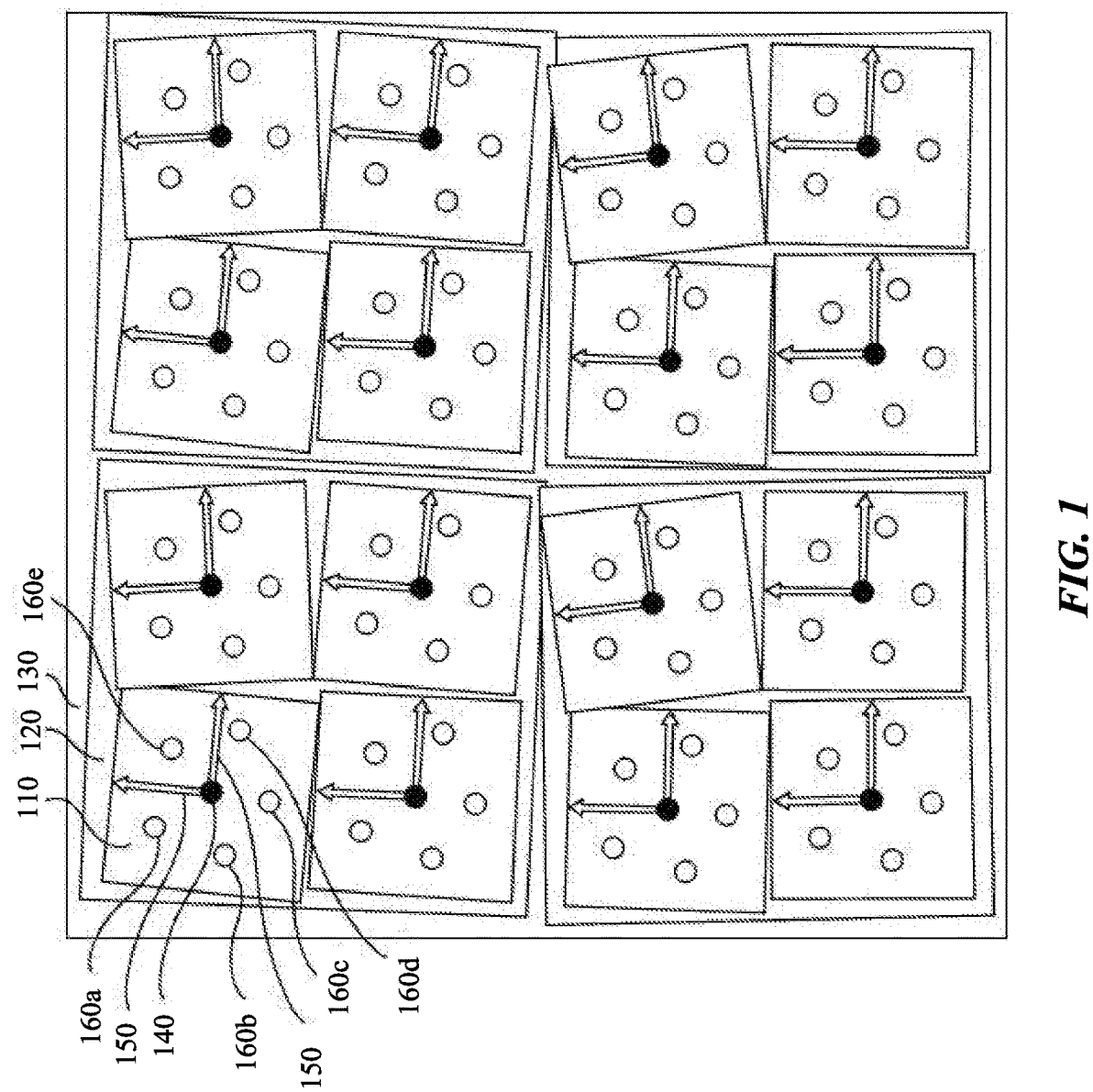
FIG. 1 illustrates an example three-level hierarchy for defining locations from which rays/beams are projected.

One of the fundamental problems in computer graphics is determining object visibility. At present, the two most commonly used approaches are ray tracing, which simulates light transport and is dominant in industries where accuracy is valued over speed such as movies and computer-aided designs (CAD). Due to the intense computational requirements of ray tracing, it is traditionally unsuitable for applications where real-time or near real-time rendering is needed. Another approach for determining visibility is z-buffering, which examines each 3D object in a scene and updates a buffer that tracks, for each pixel of a virtual rectangular screen, the object that is currently closest. Typically, z-buffering is implemented by current graphics hardware and lacks the flexibility to handle rendering tasks that deviate from the aforementioned assumptions (e.g., pin-hole camera and/or rectangular screens with uniform pixel distributions). Particular embodiments described herein provide a visibility algorithm that has performance characteristics close to that of z-buffering, but with additional flexibility that enables a wide variety of visual effects to be rendered for artificial reality.

To provide further context, conventional z-buffering is often used for addressing real-time primary visibility problems, largely due to its applicability to uniform primary visibility problems (e.g., for conventional rectangular screens) and the availability and proliferation of inexpensive, specialized hardware implementations. The z-buffer algorithm uses a z-buffer, a uniform grid data structure that stores the current closest hit depth for each sample/pixel. Most implementations of z-buffering assume samples/pixels are laid out in a uniform grid, matching precisely to the organization of the data structure. The uniform nature of the grid structure, combined with the uniform distribution of samples mapped onto this grid, allows for a very efficient algorithm for determining which samples overlap a polygon/triangle. The process of mapping the spatial extent of an object onto the grid is known as rasterization.

The uniform nature of the grid used in the z-buffer algorithm leads to high efficiency but makes the algorithm inflexible. The assumed uniform sample distribution is reasonable when computing primary visibility from a virtual pin-hole camera for almost all direct view display technologies such as TVs, monitors or cell phones. However, these assumptions do not hold for non-pinhole virtual cameras, secondary effects such as shadows and notably for modern virtual reality devices due to the distortion imposed by the viewing optics of a head mounted display, and currently must be worked around on a case-by-case basis.

Algorithms such as the irregular z-buffer still use a uniform grid but allow for flexible number and placement of samples within each grid cell. Irregular z-buffering suffers from load-balancing issues related to the conflict between non-uniform sample distributions in a uniform data structure, making it significantly more expensive than traditional z-buffering. Further, having a uniform data structure means that the algorithm supports only a limited field of view and does not support depth of field rendering.

In contrast to z-buffering, ray tracing algorithms take a more general approach to determining visibility by supporting arbitrary point-to-point or ray queries. The ability to effectively model physically-based light transport and naturally compose effects led it to be the dominant rendering algorithm rendering movie scenes. However, the flexibility that ray tracing provides comes at significant cost in performance, which has prevented it from becoming prevalent in consumer real-time applications, such as VR or AR.

Particular embodiments described herein overcome the shortcomings of existing rendering techniques to achieve ray rates in excess of 10 billion rays per second for nontrivial scenes on a modern computer, naturally supporting computer-graphics effects desirable for artificial reality.

Particular embodiments address the visibility problem in computer graphics. In particular embodiments, a rendering system may use a raycaster that uses a three-level (or more) entry-point search algorithm to determine visibility. At a high level, the system may take a hierarchical approach where larger beams (e.g., a coherent bundle of rays) are first cast to determine collision at a broader scale. Based on the hits/misses of the beams, more granular beams or rays may be cast until the visibility problem is solved. It should be noted that even though certain examples provided herein describe beams as representing coherent bundles of primary rays, this disclosure contemplates using beams to represent any type of rays (e.g., primary rays, specular reflection rays, shadow rays, etc.) whose coherent structure may be exploited by the embodiments described herein to achieve computational efficiency. In particular embodiments, the system may be implemented in a heterogeneous manner, with beam traversal occurring on the central processing unit (CPU) and ray-triangle intersection and shading occurring on the graphics processing unit (GPU). In other embodiments, every computation task may be performed by the same type of processing unit.

FIG. 1 illustrates an example three-level hierarchy for defining locations from which rays/beams are projected. In particular embodiments, a ray footprint 110, which may be considered as the first-level of the hierarchy, may correspond to a pixel footprint and be defined by a footprint center 140 and differentials 150 (e.g., each differential 150 may specify the distance of a footprint's boundary from the center 140 of the footprint 110). In particular embodiments, subsample locations 160a-e are assigned to a footprint 110 for anti-aliasing. In the example shown in FIG. 1, each footprint 110 includes five subsample locations 160a-e. Although the particular example shows five subsample locations 160a-e per footprint 110, any other number of subsample locations may be implemented and/or defined by an application (e.g., 32 subsample locations per footprint 110).

Figure 2:
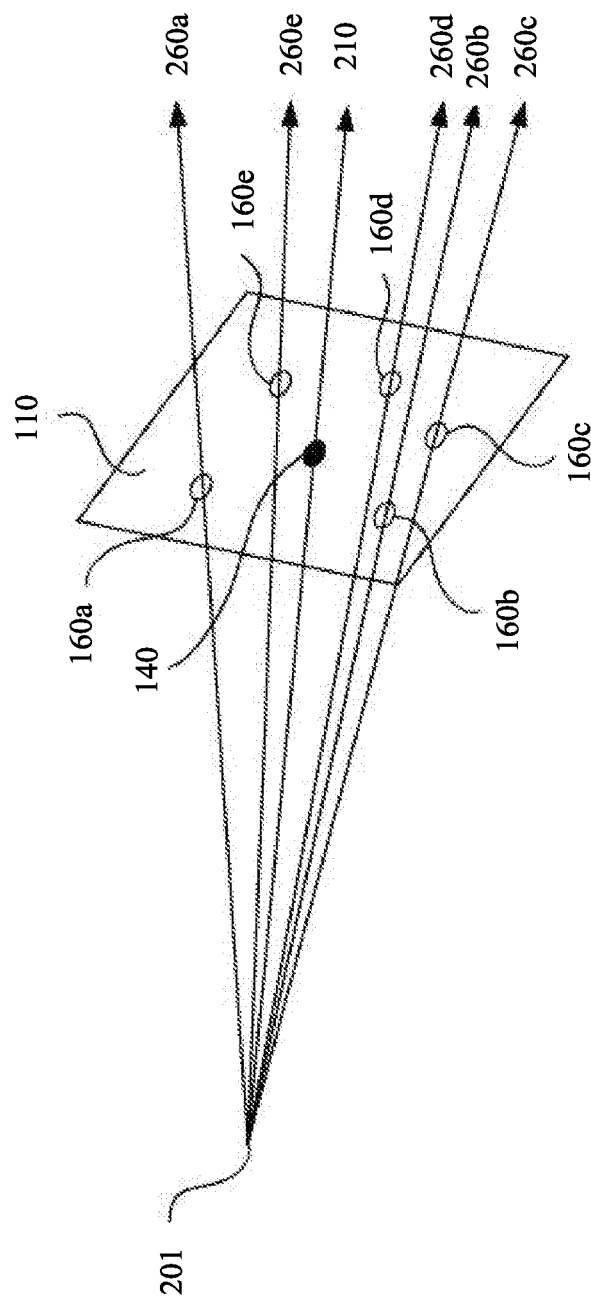
FIG. 2 illustrates an example of rays and subsample rays associated with a footprint.

FIG. 2 illustrates an example of rays and subsample rays (or subrays) associated with a footprint. In particular embodiments, a ray 210 may be associated with a footprint 110, with the ray 210 projecting through the center 140 of the footprint 110. As shown in FIG. 1, the footprint 110 may be defined by two vectors 150 (also referred to as differentials) that are mutually perpendicular with each other and the ray direction. The extent of the footprint 110 may be defined by the length of these vectors 150. In particular embodiments, subsample rays (or subrays) may be procedurally generated within this footprint 110 by first transforming a low-discrepancy point set on, e.g., the unit square of the footprint 110, using the coordinate frame defined by the ray 210 direction and footprint vectors 150. Examples of transformed points are represented by the subsample locations 160a-e, illustrated as hollow points. Ray directions may then be added to the transformed points (e.g., subsample locations 160a-e), and the subsample rays 260a-e may be defined to be rays projecting through the original ray's 210 origin 201 and the newly transformed points 160a-e, respectively. The subsample rays, for example, may be used for multi-sample anti-aliasing. In particular embodiments, for depth-of-field rays, the ray origin may also be chosen using a separate low-discrepancy point set (without translating along the ray direction).

In particular embodiments, shading may be performed one per pixel per triangle, as in regular multi-sample anti-aliasing (MSAA), which saves a large amount of shading computations. In particular embodiments, shading may be performed for every sample to get full super-sample anti-aliasing (SSAA). Since the subrays are procedurally generated rather than predefined (and stored in memory), the ray memory bandwidth may be reduced by the anti-aliasing factor when compared to naively rendering at higher resolution.

In particular embodiments, primary rays (e.g., 210) are assigned footprints (e.g., 110) for anti-aliasing and then aggregated into a second-level hierarchy and a third-level hierarchy with four-sided bounding beams with different granularity. Each beam location in the finer, second-level hierarchy may be referred to as a tile (e.g., an example of a tile is labeled as 120 in FIG. 1). Each tile 120 may include a predetermined number of pixel footprints 110. Although the example shown in FIG. 1 illustrates each tile 120 having 2×2 pixel footprints 110, any other arrangements of pixel footprints 110 may also be implemented (e.g., each tile 120 may include 16×16 pixels 110). In particular embodiments, each tile 110 may be defined by its four corner pixels 110. In particular embodiments, the tiles 120 may then be aggregated into a coarser collection of blocks 130, which is the term used herein to refer to the third-level hierarchy. Each block 130 may contain a predetermined number of tiles 120. Although the example shown in FIG. 1 illustrates each block 130 containing 2×2 tiles 120, any other arrangements of tiles 120 may also be implemented (e.g., each block 130 may include 8×8 or 64 tiles). Thus, in an embodiment where each block 130 contains 8×8 tiles 120 and each tile 120 contains 16×8 pixel footprints 110, each block 130 may represent 8,192-pixel footprints 110. The number of rays represented by a beam stemming from a block 130 can be computed by multiplying the number of pixel footprints 110 in the block 130 by the multi-sampling rate (e.g., 5 subsample rays per pixel footprint 110). Thus, if each block 130 represents 8,192-pixel footprints 110, the block 130 would represent 40,960 subsample rays.

As previously mentioned, particular embodiments described herein address chromatic aberration by sampling colors for each color channel separately. In particular embodiments, three separate rays may be cast to sample different colors that should be displayed by each pixel footprint 110. For example, a first ray may correspond to green, a second ray may correspond to red, a third ray may correspond to blue. The abundance of ray casting can be computationally expensive. Thus, in particular embodiments, the system may perform various optimizations to reduce the number of rays that need to be cast. The optimizations are discussed herein. In particular embodiments, the choice of defining the ratio between pixels and tiles to be 256:1 and the ratio between tiles and blocks to be 64:1 is based on coarse tuning for particular hardware, but other ratios may be more optimal for other types of hardware.

Figure 3:
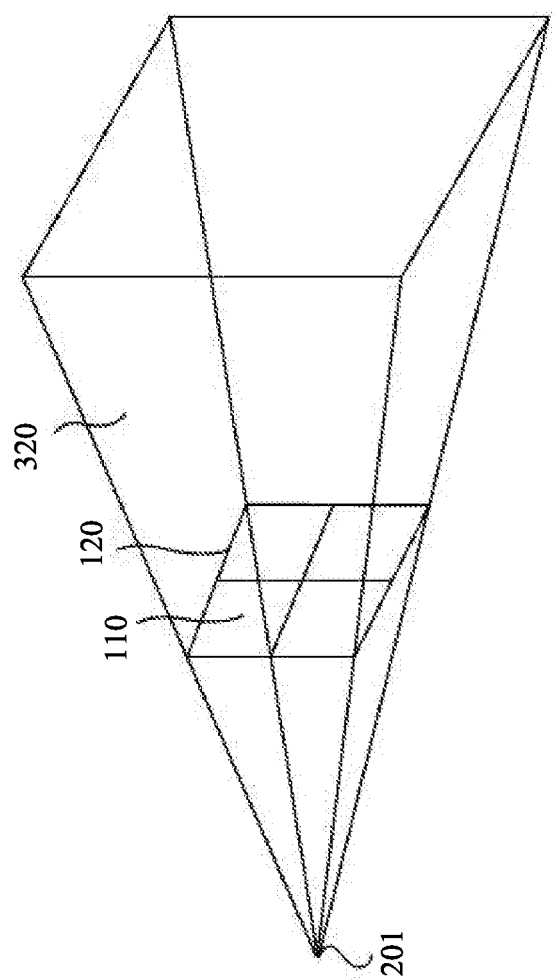
FIG. 3 illustrates an example of a beam being cast through a tile.
Figure 4:
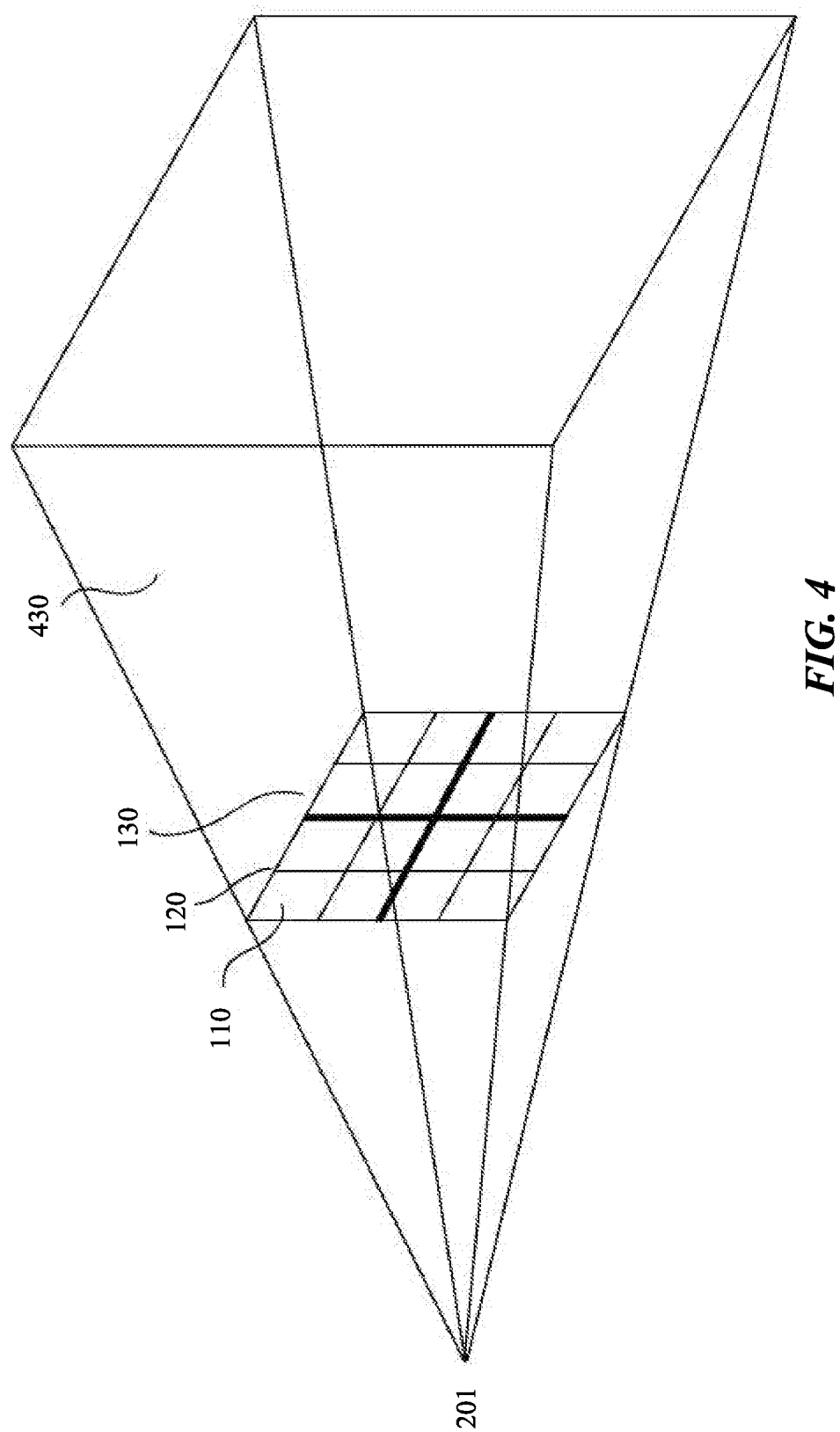
FIG. 4 illustrates an example of a beam being cast through a block.

In particular embodiments, instead of casting rays for all visibility tests, beams may be cast from the blocks and tiles in a hierarchical manner to optimize visibility computation. FIG. 3 illustrates an example of a beam 320 being cast from a point origin 201 (e.g., the camera or viewpoint) into a 3D modeling space through a tile 120 (in the illustrated example, the tile 120 contains 2×2 pixel footprints 110). The solid beam 320 in this example resembles a frustum stemming from the tile 120. The volume of the beam 320 may be defined by the vectors projecting through the four corners of the tile 120 (as illustrated) or the centers of the four corner pixel footprints 110. A surface, object, or triangle intersects with the beam 120 if the surface/object/triangle intersects with any portion of the volume of the beam 120. Similarly, FIG. 4 illustrates an example of a beam 430 being cast from a point origin 201 into a 3D modeling space through a block 130 (in the illustrated example, the block 130 contains 2×2 tiles that each contains 2×2 pixel footprints 110). The solid beam 430 in this example resembles a frustum stemming from the block 130. The volume of the beam 430 may be defined by the vectors projecting through the four corners of the block 130 (as illustrated) or the centers of the four corner pixel footprints 110. A surface, object, or triangle intersects with the beam 430 if the surface/object/triangle intersects with any portion of the volume of the beam 430.

The flexibility provided by the embodiments described herein enable a rendering system to naturally implement a variety of rendering features relevant to virtual reality or augmented reality, in contrast to existing systems that simulate such effect using post-processing. Moreover, existing graphics APIs focus on a specific case of a uniform grid of primary sampling points. While current hardware rasterizers are highly tuned for this use case, rendering for AR/VR displays requires additional high-performance functionality that is more naturally achieved by raycasting in accordance with particular embodiments.

In particular embodiments, to support optical distortion rendering, the system may perform sampling using non-uniform grid sampling patterns and use independent color channel sampling. At a high-level, when any kind of lens distortion is desired, the distortion may be applied to the rays (e.g., determining ray directions) before bounding beams are computed (e.g., via principal component analysis). To account for chromatic aberration, red, green and blue channels may be sampled separately using separate distortion definitions. Further details of the contemplated embodiments are described in further detail below.

Particular embodiments enable a graphics system to support direct optical-distortion rendering and subpixel rendering. One of the primary differences between head mounted and traditional displays is the use of viewing optics. In addition to allowing a user to focus on the display, the viewing optics add a variety of aberrations to the display as viewed. Notably, head mounted displays usually produce a pin-cushion distortion with chromatic dependency, which causes both color separation and non-uniform pixel spacing. This leads to the user effectively seeing three different displays, one for each color (e.g., red, green, and blue), with three different distortion functions. Traditionally, these artifacts may be corrected during a post-processing image distortion phase. For example, conventional rendering systems, which do not support direct-distortion rendering, would produce a conventional rectangular image. To properly view the image via a head-mounted display, a post-processing stage takes the rectangular image and create a warped image for head-mounted viewing optics. Not only is the conventional multi-stage process inefficient, the resulting effect is suboptimal.

To support optical distortion rendering, the system may allow an application using the rendering engine to specify and render with non-uniform grid sampling patterns and use independent color channel sampling. Optical distortion, in general, is due to the physics of lenses that causes light to be bent in distorted ways. In conventional rendering systems, the assumption is that the camera is a pinhole camera with uniform optics. To generate the image that would be captured by such a pinhole camera, conventional systems project rays from the pinhole camera into the 3D space through points on a flat, uniform virtual image plane. As such, a uniform grid sampling pattern traditionally suffices. However, since real-world optics are not perfect and complex (e.g., with multiple lens stacks), light does not in fact enter and exit the optics in a straight line, and the degree at which the light bends depends on its points of entry/exit and the curvature and density of the optics. Thus, images generated using a uniform grid pattern do not accurately represent what one would expect to perceive.

Particular embodiments of a rendering system allow an application (e.g., a VR or AR or gaming applications that send requests to the rendering system) to specify a distortion mesh. The distortion mesh may be defined as a curved surface in space with any desired curvature. Conceptually, a distortion mesh defines, for each pixel, the corresponding point in space that would be in focus as seen through the pixel. In particular embodiments, the distortion mesh may map screen coordinates to particular locations in the 3D world or camera space. The distortion mesh may act like a control surface that specifies how screen pixels should be extended into the 3D world space. In particular embodiments, a distortion mesh may have the same 2D size as the output image, so that there is a 1-to-1 mapping between a value stored in the distortion mesh and a pixel in the output image. Thus, when determining visibility for a particular pixel, the system may look up the corresponding value in the distortion mesh to find the point in 3D space through which a ray should pass. In other embodiments, a distortion mesh may be defined to be less than the resolution of the screen pixels. For example, rather than each pixel having a distortion mesh coordinate, the corners of a collection of pixels (e.g., a tile, such as 16×16 pixels) may be the only ones with distortion mesh coordinates. This may be suitable in embodiments where rays are cast from corners of tiles, rather than individual pixels, in order to save memory. Thus, if a screen has 2560×1600 pixels, dividing the screen into tiles would yield 160×100 tiles. The distortion mesh, in particular embodiments, could therefore be a 161×101 array for storing the mesh coordinates in view space for each corner of each tile. To further save memory, mesh coordinates could be saved for 32×32 pixel blocks instead of 16×16 pixel tiles, thereby reducing the mesh array to 81×51. In this embodiment, if rays are still cast in tile-units (e.g., for each tile corner), then some tile corners would not have an explicitly defined mesh coordinate in the 81×51 mesh array. The mesh coordinate for a tile corner located between 32 pixels, however, could be interpolated by averaging the mesh coordinates of the adjacent, explicitly defined corners of the 32×32 pixel block. In particular embodiments, the surface map may be stored as float3 or half3 buffers that map screen space to the 3D world space (or camera space). In particular embodiments, if the distortion mesh is smaller than the pixels, the distortion mesh may be defined as a Catmull-Rom surface and the precise coordinate in 3D space that a pixel maps to may be determined using interpolation. In particular embodiments, to handle field of views greater than 180 degrees, the system may switch vertex/geo/tessellation shader to output world-space positions. In particular embodiments, if a distortion mesh is defined, the vertex positions throughout the shader pipeline may be defined in world/camera space.

Figure 5:
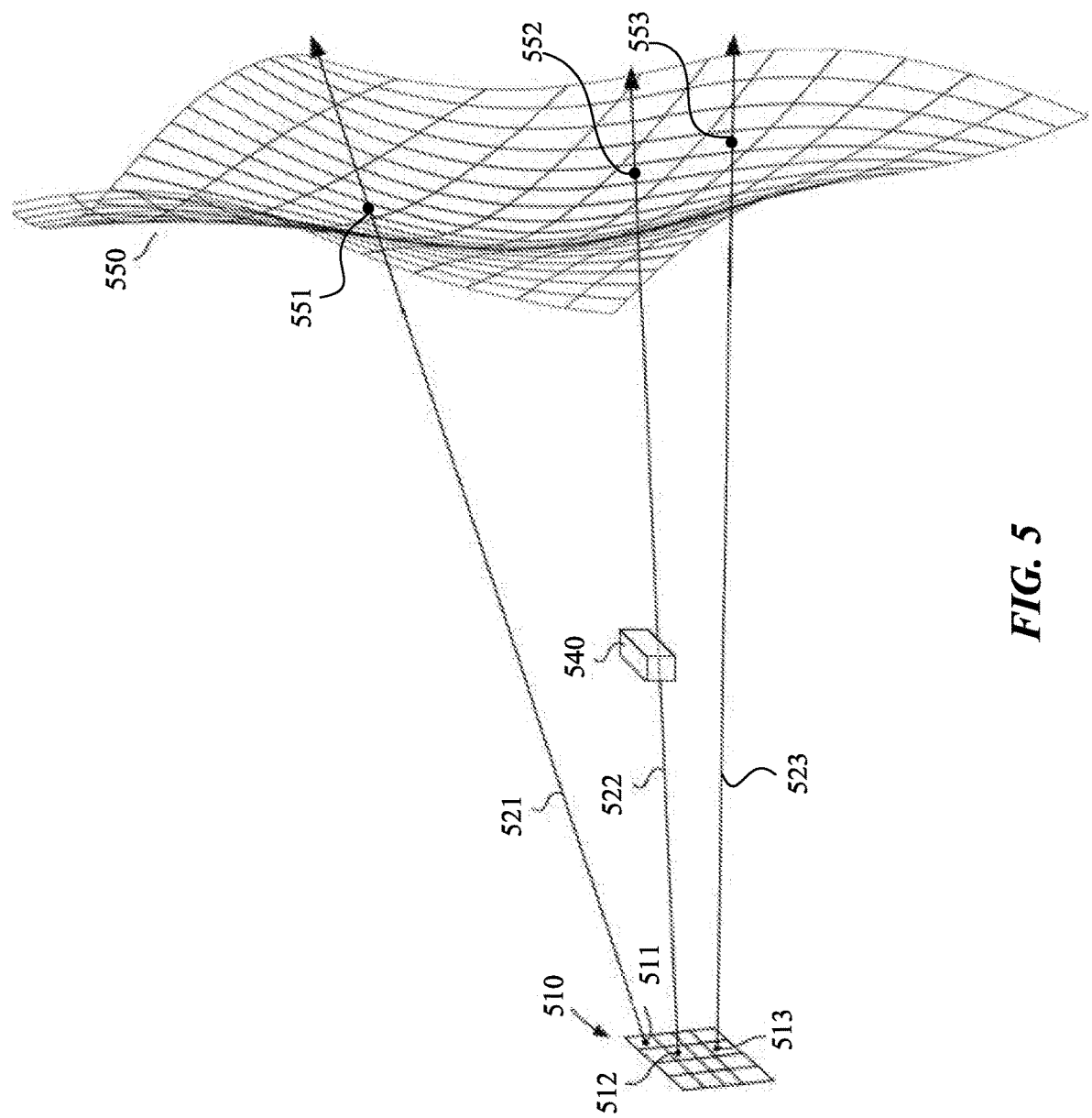
FIG. 5 illustrates an example of a beam being cast on a distortion mesh.

FIG. 5 illustrates an example of a distortion mesh 550 if it were to be displayed in a 3D world space. The distortion mesh 550, in particular embodiments, may be mathematically or algorithmically defined. In other embodiments, the distortion mesh may be defined as a lookup-table (e.g., a 161×101 mesh array or an 81×51 mesh array, depending on the size of each ray bundle being cast). In either case, given a coordinate in screen space, the distortion mesh 550 may be used to determine a corresponding coordinate in the 3D space. For example, FIG. 5 includes a conceptual representation of a virtual image sensor array 510 (which may also represent a corresponding screen). Each illustrated grid in the sensor 510, such as grids 511-513, may represent a sensor for a corresponding pixel. The distortion mesh 550 may define particular points 551, 552, and 553 in 3D space that respectively corresponds to representative points 511, 512, and 513 of their respective pixels (or subpixels). As previously described, each point, such as point 551, conceptually may represent the point in space that would be in focus as seen at the corresponding point 511. During raycasting/tracing, rays 521, 522, and 523 may be projected from the points 511, 512, and 513, respectively, through points 551, 552, and 553, respectively, as specified by the distortion mesh 550. The rays 521, 522, and 523 may be used to determine object visibility. For example, object 540 in FIG. 5 is visible from point 512, but not points 511 and 513. In particular embodiments, subsample rays associated with each pixel may similarly be mapped onto the distortion mesh 550. For example, in addition to point 511, additional subsample locations may be associated with the same pixel footprint. A projection of the subsample locations may be defined on the distortion mesh 550. For example, the projection of the subsample locations may be defined to be within the same grid in which point 551 is defined. During a visibility test, object intersections may be tested by casting subsample rays from the subsample locations through the corresponding projection of the subsample location on the distortion mesh 550. Alternatively, after the intersection between a ray bundle (e.g., cast from the four corners of a tile) and a surface has been determined in 3D view space, a corresponding region of intersection may be determined in 2D texture space, and texture sampling locations may be determined within that region in 2D texture space. For example, if a ray bundle is cast from a tile that corresponds to 16×16 pixels, 16×16 sampling points may be determined within the intersecting region in 2D texture space to determine the colors for the corresponding 16×16 pixels.

The distortion mesh 550 provides applications/users with the flexibility to define any desired ray directions to generate any desired resulting effects. For example, if an application wishes to simulate optical distortion, it may define a distortion mesh 550 that approximates the desired distortion caused by optics. Based on the distortion mesh 550, individual rays may be projected in any direction (rather than being cast uniformly through a conventional grid), similar to how light would be bent by the optics. In particular embodiments, to account for chromatic aberration, separate distortion meshes 550 may be defined for separate colors (e.g., red, green, and blue) since different wavelengths may be distorted differently through the same medium. Thus, when casting rays for each pixel (or for the corners of tiles), the system may cast a red ray based on the distortion mesh defined for red, a green ray based on the distortion mesh defined for green, and a blue ray based on the distortion mesh defined for blue. In alternative embodiments, the system may have a mesh array (e.g., 81×51 array) that explicitly defines the distortion mesh locations for green in view space (e.g., each array element stores X and Y positions in view space for green). Rather than having separate mesh arrays for red and blue, the data associated with each array element may indicate red and blue offset values that are defined relative to green (e.g., each array element stores X and Y offset positions for red and X and Y offset positions for green). In operation, the system may cast a green ray for a pixel based on the corresponding distortion definition in the mesh, and then compute where the red and blue rays would have traveled using their respective offset values. This embodiment has the computational advantage of reducing the number of rays cast per pixel (e.g., rather than casting three for RGB, the system would only cast one and then simulate the ray trajectories for the other two using the offsets).

In particular embodiments, the above raycasting techniques may be implemented by a display engine (e.g., located on an AR/VR headset) configured to receive display content (e.g., surfaces from a linked computer with a GPU) and perform various techniques that enables a user to have a realistic, responsive VR or AR experience. Such techniques include distortion, resampling, composition, and color correction. Even though the linked computing system may only supply surfaces for 60 Hz frames, the display engine may be configured to adjust or warp the surfaces for each frame to accommodate characteristics of the display at a much faster frame rate. Each frame may be rendered based on the user's current head position, and in some cases also the current eye position. In particular embodiments, the display engine may support 220 Hz frames per second and a 2560×1440 display size, although any Hz frames per second and any display size is contemplated by this disclosure. The display engine may generate 1,000 pixels per second per eye. The display engine may generate two pixels per eye per clock, thus requiring a 500 MHz system clock rate.

In particular embodiments, the display engine may meet the above requirements by performing bilinear interpolations on image surfaces that are generated by a standard CPU or GPU. An image surface (or simply, "surface") may be a rectangular texture with a transformation matrix to specify its location in the scene. A texture is made up of multiple texels. Each texel contains information about its position (per the associated transformation matrix) and RGB color data as well as transparency data (stored in the alpha channel and denoted by the letter "A"). Thus, in this disclosure, the acronym RGBA may denote the color values for Red, Green, Blue, and Alpha (e.g., each may be represented by a 4-bit or 8-bit value, or the color values may each be represented by a 5-bit or 10-bit value and the corresponding alpha may be represented by a 1-bit or 2-bit value, etc.).

In particular embodiments, the display engine may determine the RGBA values for each pixel in the display by first casting a ray from the relevant pixel (or cast ray bundles for the corners of tiles, as described above) onto the image surface to determine a sample location in texture space, and then using bilinear interpolation (or any other suitable interpolation techniques) to approximate the color and/or alpha value. In particular embodiments, a separate ray may need to be cast for each R, G, and B color to account for chromatic aberration. However, this may be an expensive calculation, so various optimizations may be made. These optimizations are discussed below with reference to FIGS. 9A-9D.

Figure 6:
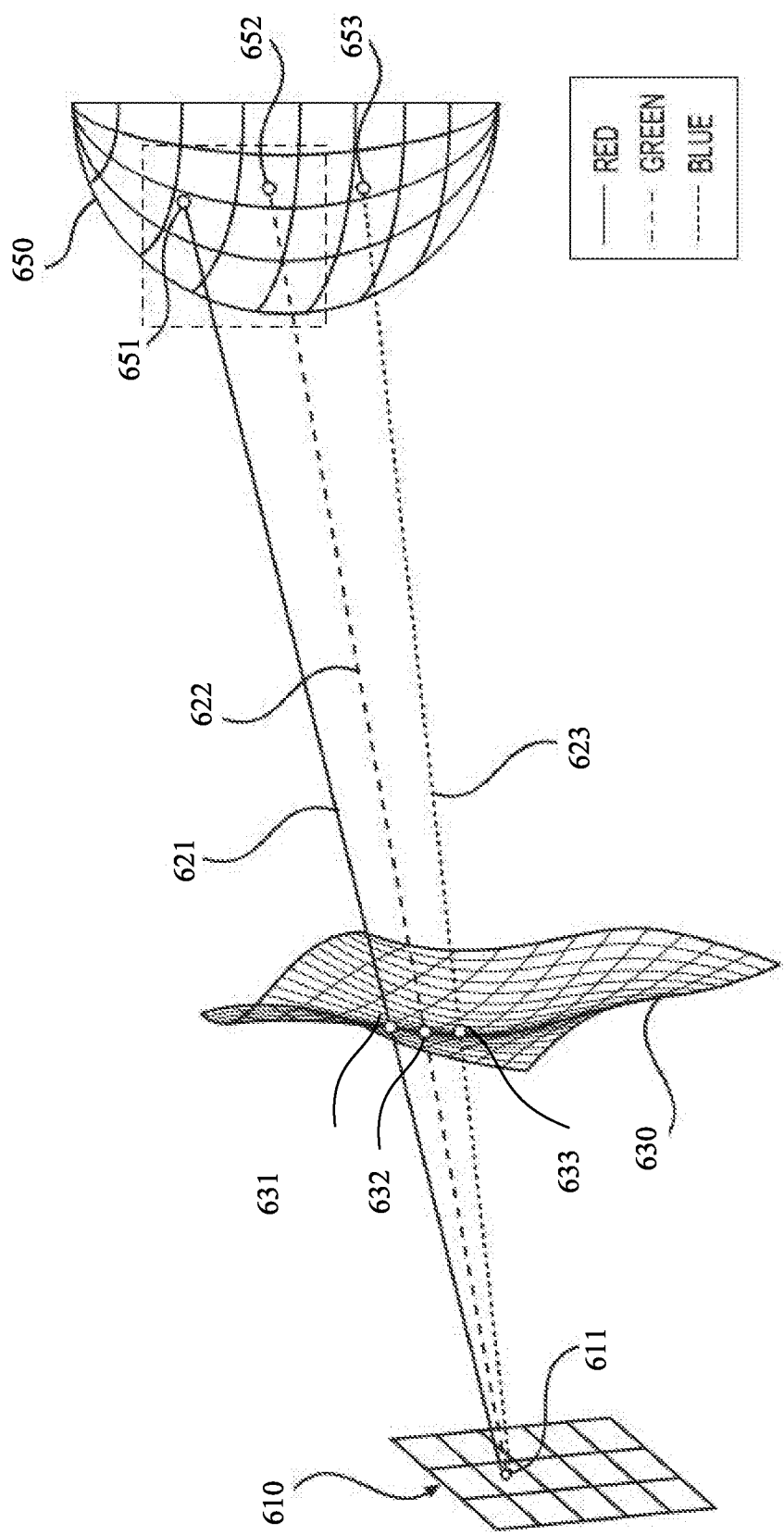
FIG. 6 illustrates an example of a beam being cast through an example distortion mesh onto an image surface.

FIG. 6 illustrates an example of a ray being cast through an example distortion mesh. FIG. 6 includes a conceptual representation of a virtual image sensor array 610 (which may also represent a corresponding screen). Each illustrated grid in the sensor 610, such as grid 611, may represent a sensor for a corresponding pixel. For each pixel, the display engine may cast three rays: a separate ray for R, G, and B. In particular embodiments, the amount of distortion for each color component may be individually defined (e.g., using a distortion mesh). Although this example shows rays being cast from a pixel, rays could similarly be cast from corners of tiles (e.g., defined to be a group of 16×16 pixels), as described elsewhere herein. Similarly, although for simplicity and clarity the description below describes rays being cast from pixels, the same concept for distorting rays may be applied to rays that are cast from the corners of tiles.

As an example, FIG. 6 illustrates rays 621, 622, and 623 being cast from grid 611 of virtual image sensor array 610 to illustrate how the display engine may use a distortion mesh to apply various distortions to the display, such as a counter to chromatic aberration or rolling shutter, as well as foveation, to name just a few examples. In the physical world, when light passes through a lens, each of the RGB colors bend at different angles. The distortion mesh provides applications/users with the flexibility to define any desired ray directions to generate any desired resulting effects. For example, if an application wishes to simulate optical distortion, it may define a distortion mesh that approximates the desired distortion caused by optics. Based on the distortion mesh, individual rays may be projected in any direction (rather than being cast uniformly through a conventional grid), similar to how light would be bent by the optics. The distortion mesh 630 of FIG. 6 is used to adjust for chromatic aberration caused by an optical lens that is located between the user's eye and the display screen of the VR or AR headset. The lens in the VR or AR headset is a physical lens that is subject to physical optics properties. Thus, when light passes through the edge of the lens, chromatic aberration occurs. To correct for the chromatic aberration, the display engine may need to determine how much the red, green, and blue rays are shifting, and offset the sample locations by the appropriate amount. For example, if, relative to green, red shifts up by two pixels and blue shifts down by two pixels, the display engine may offset the red two pixels down and may offset the blue two pixels up, so that when the light passes through the lens of the VR or AR headset, the chromatic aberration combines the RGB light rays to form unified shapes. In other words, it may appear to the user as if no chromatic aberration has occurred.

In particular embodiments, when a ray is cast from a given pixel (or the corner of a tile) of virtual image sensor array 610, its trajectory may be defined by one or more distortion meshes. In particular embodiments, a distortion mesh for a pixel array may be defined by a mesh array, as described in more detail elsewhere herein. Each array element, which may correspond to a pixel (or tile corner) may store a distortion mesh location in view space. Together, the distortion mesh locations defined by the mesh array may be conceptually shown as the distortion mesh 630 in FIG. 6. To help illustrate the ideal, FIG. 6 shows ray 622 (corresponding to a particular chromatic component, such as green, in this example) being cast from pixel 611. When a ray is cast from that pixel 611 (or a tile corner), the mesh array may be used as a look-up table to find that the mesh location 632 corresponds to the pixel 611. A ray 622 may then be cast into 3D view space directed towards the mesh location 632.

In particular embodiments, to account for chromatic aberration, separate rays from the same origin may be cast to account for different color components, such as RGB. As an example and not by way of limitation, a ray 621 for red may be cast from pixel 611 of virtual image sensor array 610. The red ray 621 may be cast based on the same mesh array or a different mesh array than the one that defines the distortion mesh location 632 for green. If a separate mesh array defines the distortion mesh location 631 for the red ray 621, a mesh array element therein may correspond to pixel 611 and indicate the position of the distortion mesh location 631 in view space. Alternatively, the mesh array element that was used for determining the distortion mesh location 632 for green may store an offset value, defined relative to green's distortion mesh location 632, that can be used to compute the distortion mesh location 631 for red. In a similar manner, the distortion mesh location 633 may be determined for the blue ray 623. Distortion mesh 630 may be predefined and may direct the rays in any suitable direction according to how distortion mesh 630 is defined. It should be noted that while FIG. 6 shows a single "mesh" structure on which the red, green, and blue distortion mesh locations 631-633 all reside, the three may not necessarily all be on a continuous mesh as illustrated, as it has been simplified for clarity.

In the example of FIG. 6, ray 621 corresponds to red light, ray 622 corresponds to green light, and ray 623 corresponds to blue light. In particular embodiments, each of these rays are cast separately so that the display engine may determine their respective RGB color values using bilinear interpolation. As an example and not by way of limitation, ray 621 may intersect the image surface 650 at point 651, ray 622 may intersect image surface 650 at point 652, and ray 623 may intersect image surface 650 at point 653. In particular embodiments, each ray 621, 622, and 623 may be cast based on its own distortion mesh. As an example and not by way of limitation, a first distortion mesh may be used for ray 621, a second distortion mesh may be used for ray 622, and a third distortion mesh may be used for ray 623. In particular embodiments, a single distortion mesh may be used for ray 622, which corresponds to green, and rays 621 and 623, which correspond to red and blue respectively, may be computed as offsets of the casted ray 622 for green. As an example and not by way of limitation, Ray 622 may be cast and intersect with distortion mesh 630 at a particular mesh location. The mesh location may trigger the offset process and may also specify how much rays 621 and 623 should be offset relative to green.

In particular embodiments, an example transform block includes state registers for implementing the example distortion mesh. One of the registers may be referred to as "StartWarpArray." In particular embodiments, the example StartWarpArray may be an 81×51 array of values that map the corners of 32×32 blocks of screen pixels to positions in view space (e.g., surface locations on the image surface). In particular embodiments, the entries in StartWarpArray may be corner values for tiles to the right (e.g., tiles that start at the right of the display). In particular embodiments, each array element of the StartWarpArray may contain the following entries, which may refer to the green color component (the red and blue corrections may apply to the lower order bits of ViewX and ViewY): GreenXv may be a fixed point Xv position in normalized view space; GreenYv may be a fixed point Yv position in normalized view space; RedX may be the red chromatic aberration adjustment in X, relative to green; RedY may be the red chromatic aberration adjustment in Y, relative to green; BlueX may be the blue chromatic aberration adjustment in X, relative to green; BlueY may be the blue chromatic aberration adjustment in Y, relative to green; RedInterp may indicate how to interpolate red tiles relative to green; BlueInterp may indicate how to interpolate blue tiles relative to green. In particular embodiments, another example state register included in the example transform block may be "EndWarpArray." This may be an 81×51 array of values that map the corners of 32×32 blocks of screen pixels to positions in view space. In particular embodiments, the entries in EndWarpArray may be corner values for tiles to the left (e.g., tiles that end at the left of the display).

As described elsewhere herein, the rays that are cast may be tested against each surface in a scene to determine whether the rays intersect with any of the surfaces. In particular embodiments, another example state register may be "SurfaceArray," which store data associated with each surface in the scene. For example, the transform block may process a set of surfaces in sort order (e.g., by depth, with the closer ones ordered first). The following data is stored for each of the surfaces. SurfaceWidth, which may be the width of the texel array in texels is this value plus one; SurfaceHeight which may be the height of the texel array in texels is this value plus one; MinXv which may be the minimum X for the surface's bounding box in view space; MinYv, which may be the minimum Y for the surface's bounding box in view space. MaxXv, which may be the maximum X for the surface's bounding box in view space; MaxYv, which may be this is the maximum Y for the surface's bounding box in view space. JitterX, which may specify the X coordinate of a per-surface jitter offset to support temporal edge anti-aliasing. JitterY, which may specify the Y coordinate of a per-surface jitter offset to support temporal edge anti-aliasing. SurfaceType which may specify whether the surface is unused, a label surface, or an image/mask surface; BaseXv, BaseYv, BaseZv, which may be the location of (S,T)=(0,0) for the surface in view space; NormalXv, NormalYv, NormalZv, which may be the normal vector for the surface in view space; SvectorXv, SvectorYv, SvectorZv, which may be vectors from (0,0) to (1,0) in view space; TvectorXv, TvectorYv, TvectorZv, which may be vectors from (0,0) to (0,1) in view space; SlengthInvXYZv, TlengthInvXYZv which may be the inverse of the length of Svector and Tvector.

Figure 7:
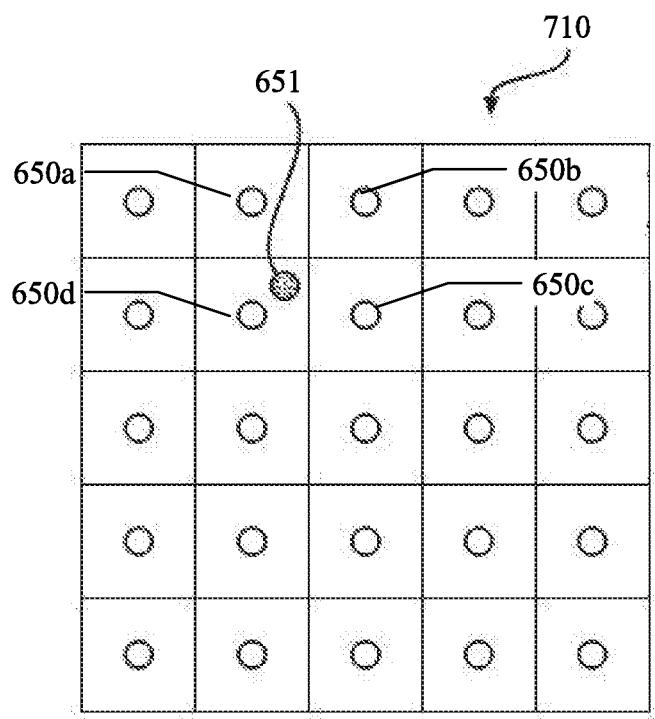
FIG. 7 illustrates an example texture grid.

The purpose of ray casting is to determine visibility and to determine the appropriate color for the pixel associated with the associated ray. The intersection of a ray with a surface 650 defined in a three-dimensional world space indicates that the point of intersection is visible through the pixel associated with the ray. Once the point of intersection is determined (e.g., points 651, 652, and 653), a corresponding sample location in two-dimensional texture space may be computed. In the example of FIG. 6, the pixel that corresponds to grid 611 casts rays through distortion mesh 630 and onto image surface 650, which has a corresponding texture. FIG. 7 illustrates a portion of the texture for surface 650 that corresponds to the broken-line bounding box in FIG. 6.

FIG. 7 illustrates an example texture that is represented as a texel grid 710. Texel grid 710 may include many texels (e.g., 650a-650d), which contain color and transparency data. Texel grid 710 may correspond to the broken-line bounding box illustrated in FIG. 6. In particular embodiments, each texel's location may be represented by its center point (e.g., the texel point 712 represents the center of the texel 650a). In particular embodiments, the color and transparency information associated with a texel 650a reflects the color and transparency information at its center 712. Thus, if a sample location does not coincide exactly with a texel's center, the appropriate color and transparency information at that sample location is approximated using the color/transparency information associated with the neighboring texel centers. Referring again to FIG. 6 as an example, through ray casting, the system may determine that the intersection between the red ray 621 and the surface 650 may be at point 651. When the point of intersection 651 is transformed from three-dimensional world space to texture space, it may appear at the location of the shaded point 651 in FIG. 7. Through this transformation, the coordinates of point 651 in texture space is known. However, the R color value of point 651 is unknown and is what the display engine will calculate using bilinear interpolation. It will perform similar calculations for the green color value of point 652 and the blue color value of point 653. In particular embodiments, for each color computation, the corresponding transparency value may be determined as well. For example, not only will the four closest texels 650a-650d around the sample point 651 be used to determine its red color value, they will also be used to determine the interpolated transparency value at sample point 651.

In particular embodiments, the display engine may perform either bilinear interpolation, point-sampling, or both. Both methods may compute a filtered result that depends on the (u,v) coordinate of sample position 651. The (u,v) coordinate may be divided into integer parts (Uint, Vint) and fractional parts (Ufrac, Vfrac), where Uint=int(U), Vint=int(V), Ufrac=frac(U) and Vfrac=frac(V). In particular embodiments, point sampling may mean selecting the nearest texel to the sample position. In the example of FIG. 7, texel 650d would be selected. This allows a power optimization since the multipliers used for bilinear filtering can be turned off. The selected texel is (round(u), round(v)). Rounding is done by adding ½ and truncating. In particular embodiments, bilinear interpolation blends the four nearest texels to the sample position using three multiply/add steps. The four nearest pixels have U coordinates Uint or (Uint+1) and have V coordinates Vint or (Vint+1). First the two horizontal pairs of texels are interpolated, both using Ufrac as the interpolation weight. Then those results are interpolated using Vfrac as the interpolation weight. In particular embodiments, the interpolation equation is A*weight+B*(1−weight), where A is the lower address texel and B is the higher address texel. For implementation, this is rewritten as (A−B)*weight+B. Note that this rewritten equation also avoids the need to multiply by 1. As an example and not by way of limitation, if Ufrac has 6-bits of precision, a 6-wide multiplier is sufficient. The display engine may support both one-cycle interpolation, which performs an N×N multiply and rounds off N low order bits, and two-cycle interpolation, which performs two N×N multiplies to produce a 2N-bit result and rounds off N low order bits. The number of bits of result may be equal to N times the number of cycles used for the multiply. In particular embodiments, color and alpha values may require two-cycle processing, although one-cycle filtering may be selected. Distance values may be 6-bits and may require only one-cycle interpolation. In particular embodiments, the display engine may also support a channel sharing interpolation option. In this mode, the red and blue alpha channel for images or the red and blue distance values for labels may not be filtered. Instead, those values are supplied by the green channel interpolation result. This may reduce power for bilinear interpolation by disabling some of the multipliers. In particular embodiments, channel sharing may be specified per tile, rather than per surface, since its use depends on the degree of chromatic aberration at a tile.

Figure 8:
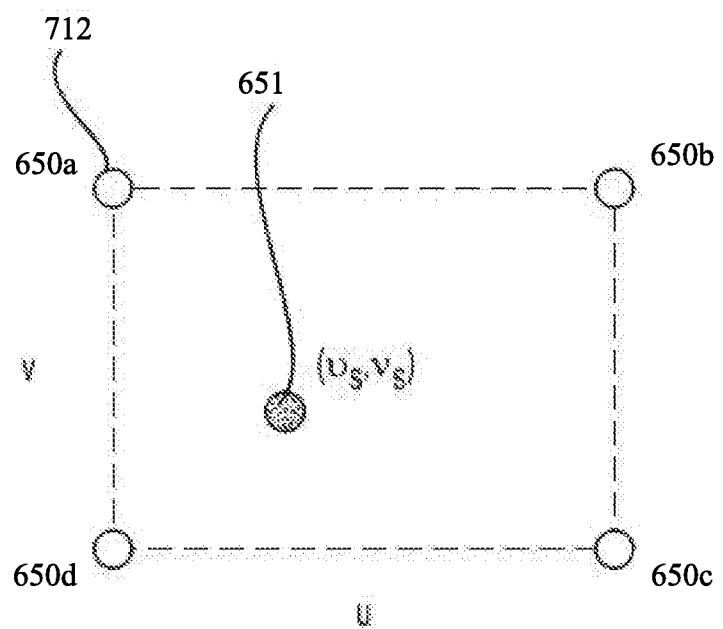
FIG. 8 illustrates an example visualization for bilinear interpolation.

FIG. 8 illustrates an example visualization for bilinear interpolation of point 651. The purpose of performing bilinear interpolation on point 651 is to determine its red color value and/or transparency value. As mentioned previously, the coordinates of point 651 are known. The coordinates of R1, R2, R3, and R4 are also known. The red color value of point 651 is unknown and is what the display engine will calculate using bilinear interpolation (or any other type of interpolation, such as bicubic interpolation). It is assumed that there is a constant transition between points R1, R2, R3, and R4. For example, if the value of R1 is 50 and the value of R2 is 100, the value of a point midway between R1 and R2 is 75. As another example using the same values at R1 and R2, the red value of a point 40% of the way from R1 to R2 is 70. To compute the red color at sample location 651, the system may determine (1) the interpolated red color value between 650a and 650b at the $u_s$ location, (2) the interpolated red color value between 650c and 650d at the $u_s$ location, (3) and the interpolated red color value between the interpolated color values from (1) and (2) at the $v_s$ location. The transparency at the sample location 651 may be similarly determined. The blue color value for point 653 and the green color value for point 652 may likewise be calculated using bilinear interpolation. The display engine may use these color values to correct for the chromatic aberration that occurs when light passes through the lens of the VR or AR headset.

Figure 9A:
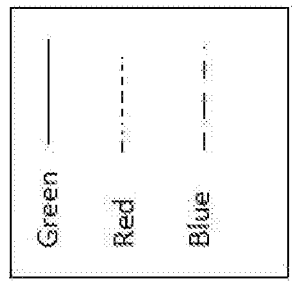
FIGS. 9A-9D illustrate example chromatic aberrations applied to a tile after a beam has been distorted by a distortion mesh.
Figure 9A:
Figure 9A:
Figure 9A:

FIGS. 9A-9D illustrate example chromatic aberrations applied to a tile after a beam has been distorted by a distortion mesh. Each polygon illustrated in FIG. 9A represents a tile for a particular color after it has been cast based on a distortion mesh and onto a surface. As previously described, a tile (or block) may be defined as a collection of pixels (e.g., 16×16 pixels) in screen space. In particular embodiments, a beam may be cast from a representation of the tile in world space to determine visibility (visually, the cast beam may appear as a frustum). The cast beam may be represented by rays cast from the four corners of the tile. Separate beams for each tile may be cast for individual color channels, and each ray may be individually distorted to adjust for chromatic aberration. Thus, after the beam rays have been distorted by the distortion mesh and are projected on the image surface, the projected footprint of the tile may appear distorted from the original tile. This is due in part to the distortion mesh and in part because the surface may not be a flat and vertical surface.

Even though beams for individual colors may be cast from the same tile location, where they intersect a surface may vary depending on the amount of "bend" caused by the individual distortion meshes (e.g., to adjust for chromatic aberration). To illustrate, representations of projected tiles corresponding to green, blue, and red are shown in FIGS. 9A-9D. FIG. 9A shows the three projected tile representations separately.

Figure 9B:

FIG. 9B represents a projected tile that has only minor offsets between red, green, and blue, due to the distortion caused by the RGB rays cast according to the distortion mesh. In FIG. 9B, the sample locations for each color are roughly the same. If the distortion mesh for RGB is configured to address chromatic aberration caused by typical lenses, rays that are cast from pixels/tiles near the center of the screen may experience minimal distortion since there is minimal chromatic aberration near the center of the lens. As a result, the differences between the projected tiles of the three colors shown in FIG. 9B may be minimal. In this case, the three projected tiles are not only close spatially, but they also have similar shapes and sizes. As such, in particular embodiments, the projected tile for green may be used to approximate the projected tiles for red and blue, thus obviating the need to process the red and blue computations separately.

Figure 9C:
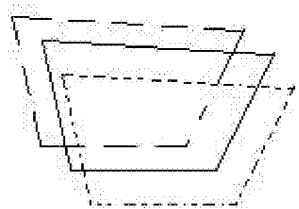

FIG. 9C represents projected tiles that have medium offsets between red, green, and blue to reflect relatively larger chromatic aberration that could be present for pixels that are farther away from the screen center. As a result, the spatial difference between the projected tiles may be greater and the shapes and sizes of the projected tiles may exhibit greater differences (albeit slight), relative to what is shown in FIG. 9B. As will be described in further detail below, FIG. 9C shows differences between the projected tiles that are less than a threshold difference, and as such certain optimization techniques may still be applicable. For example, rather than computing the red and blue projected tiles separately, the projected tile for green may be shifted, based on the red and blue offsets, to approximate the projected tiles for red and blue. Shifting the projected tile for green is computationally much less costly than computing the red and blue projected tiles independently. This optimization technique is suitable because the shapes of the different projected tiles are roughly the same, but the spatial difference between the three projected tiles is more significant than what is shown in FIG. 9B to warrant the shifting operation.

Figure 9D:
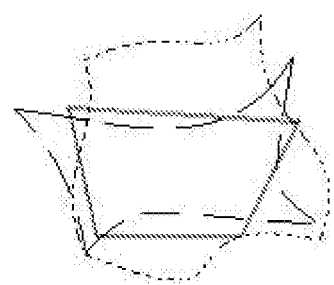

FIG. 9D represents a projected tile that has large offsets between red, green, and blue. This may be due to, for example, the tiles being projected from regions of the screen that are far from the center, where strong chromatic aberration may occur. Here the sample locations for each color are different and are above a threshold difference. Also, in FIG. 9D, the projected color components of the tile are significantly different in shape. Since the rays from the corners of a tile are individually distorted, the shape of the projected tile may vary between RGB colors. FIG. 9D illustrates this principle. The shape distortion is significant because it is the reason why in the example scenario of FIG. 9C, when the offset is minor, the display engine may simply compute the sample locations for red and blue by shifting green's projected tile. But in the example scenario of FIG. 9D, the display engine can no longer simply shift the projected tile of green because the spatial locations and shapes of the projected tiles are significantly different. Thus, in this scenario, the display engine may have to determine the projected tiles for each color component separately.

The optimization techniques mentioned below will now be described in further detail. In general, the display engine may determine the amount that the red and blue tiles are offset from the green tile. Depending on the size of the offset, the display engine may perform various optimizations. If the offset is small, the chromatic aberration is negligible, so it is unnecessary to cast red and blue rays when they will be cast in substantially the same direction as the green ray is cast. In this case, the display engine may only cast a green ray. Instead of casting a red ray and a blue ray, the display engine may simply use the determined intersection location of the green ray (e.g., the projected green tile) to approximate the intersection locations of the red and blue rays. With reference to FIG. 9B, the corners of the tile are substantially in the same location; this is why the display engine can determine the location for the green tile and use the same location for the blue tile and the red tile.

If the relative distortion between the colors is more than the aforementioned negligible amount but is less than a predetermined threshold amount, the display engine will use the location of the green ray to determine the locations of the red and blue rays. If the distortion mesh is adjusting for a traditional optical lens, small distortions will likely occur when rays are cast from pixels corresponding to the center of the distortion mesh. This is because little to no chromatic aberration occurs at the center of an optical lens, and the distortion mesh may be configured to have similar characteristics. However, in the example of FIG. 9C, the casted ray is no longer intersecting the distortion mesh at the "center," where minimal distortion is defined. Instead, FIG. 9C illustrates projected RGB tiles that have undergone a medium shift according to the distortion mesh. In this case, the distortion offset between green and the other two color components may be larger, but still below a threshold amount. Continuing with the analogy to a traditional optical lens, the rays in FIG. 9C may be cast further away from the center of the lens. In this scenario, there may be more significant relative displacement between the projected tiles, but the relative shape of the tiles may still be substantially equal to one another. For example, the shape of the projected blue tile may be substantially the same as the projected shape of the red and green tiles. Since the red and blue offsets are small, the display engine may take the intersection or sample position of the green ray and offset it by the offset amounts for blue and red components to approximate the intersection or sample positions of the blue and red rays, respectively. For example, the green ray may intersect the surface at position u. If the distortion is more than negligible (e.g., such as the distortion illustrated in FIG. 9B), but is somewhere less than a threshold distortion (e.g., such as the distortion illustrated in FIG. 9C), the display engine may determine that the position of the blue ray is u+1, and the position of the red ray is u−1. This saves processing power because the display engine need not cast the red and blue rays to determine their location. It may simply take the green ray position and add or subtract a predetermined offset. The offset data may be stored in association with the distortion mesh.

FIG. 9D illustrates a projected tile that has undergone a large distortion in the RGB rays cast according to the distortion mesh. In this case, the green ray may be cast and may be distorted above a threshold level relative to the distortion of the blue and red rays, both spatially and in its shape. In this case, the display engine may separately cast each color ray, as described herein. This may be because both the spatial difference between the tiles and their respective shapes may be too large to simply apply an offset to the green tile. The following table summarizes the above discussion.

| Offset | Action Taken |
| --- | --- |
| Distortion of green ray is smaller than A. | Use green ray for blue and red rays. |
| Distortion of green ray is larger than or equal to A but smaller than B. | Use green ray plus or minus an offset amount for blue and red rays. |
| Distortion of green ray is larger than or equal to B. | Cast red and blue independently and perform bilinear interpolation on all three colors. |

The multi-channel ray casting method for determining primary visibility described above may be used by a display engine. In particular embodiments, the display engine may cast rays at pixel locations on the screen and may produce interpolation commands to send to one or more pixel blocks. This process may include a four-stage pipeline. First, a ray caster may issue ray bundles in the form of 16×16 tiles of pixels, finishing each horizontal row of tiles before moving to the next. Ray positions may be specified in the pixel coordinate space of the screen. Each tile is represented by the position of its four corners. Next, the rays may be distorted (e.g., to account for lens distortion and rolling shutter correction). The distortion may be performed using lookup tables that specify the four corners of the tile as well as other information, as discussed herein. The rays may be centered at the positions of green pixels in the resulting view space. Chromatic aberration and other corrections may be specified as offsets from the green ray positions. Next, the display engine may compute the bounding box of the tile in view space and compares this to view space bounding boxes that have been pre-computed for the surfaces, which may have also been sorted into depth order. When the tile and surface bounding boxes intersect, the tile and surface number may be sent to the next stage. Finally, the display engine may convert the corners of the tile from view space into (U,V) coordinates in the address space of each surface. The surface/tile pair may then then be passed to the pixel blocks. In particular embodiments, each tile may represent 16×16 pixels.

Figure 10:
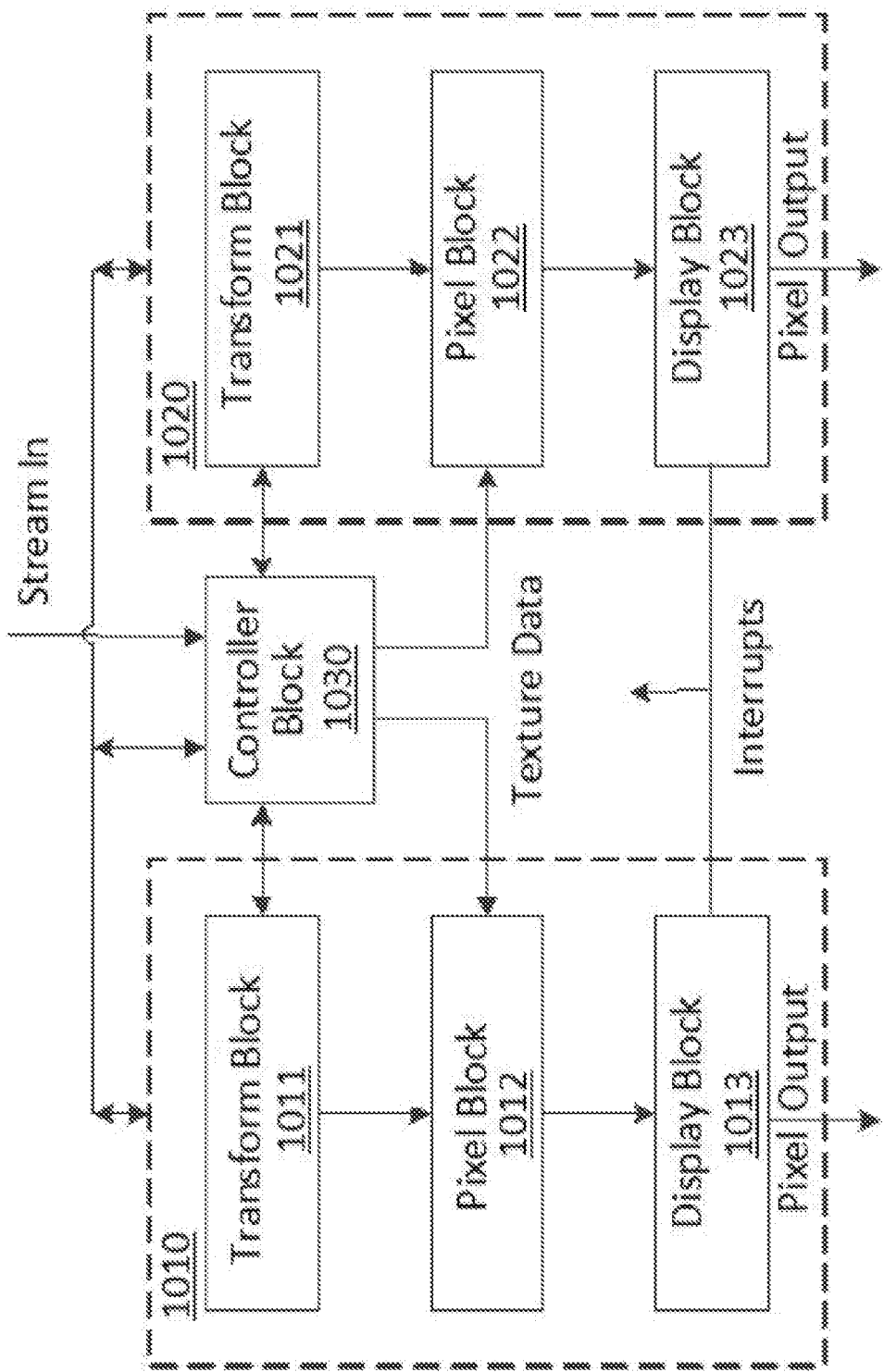
FIG. 10 illustrates an example block diagram for a transform module.

FIG. 10 illustrates an example block diagram for a display engine, in accordance with particular embodiments. The preceding discussion has focused on a conceptual model of how the display engine determines sample locations for pixels and their color values and corrects for chromatic aberration. The following provides a high-level discussion of the computing components that carry out the above concepts. The display engine may be divided into four blocks: controller block 1030, transform block 1011, 1021, pixel block 1012, 1022, and display block 1013, 1023. The reason there are two transform blocks, pixel blocks, and display blocks is because each eye has its own display pipeline 1010 or 1020. For instance, a display pipeline 1010 comprising the transform block 1011, the pixel block 1012, and the display block 1013 is for the left eye, and a display pipeline 1020 comprising the transform block 1021, the pixel block 1022, and the display block 1023 is for the right eye. The display pipelines 1010, 1020 may be connected via the controller block 1030. Controller block 1030 includes a micro-controller as well as shared local memory and an SRAM that stores texture data. The input to the controller block is the graphics output from a GPU or CPU that is used to generate a surface. Transform blocks 1011, 1021 are where the distortion mesh and associated data are used for ray casting. Transform blocks 1011, 1021 may apply distortion to pixel positions on the display by looking up values in a distortion mesh. After the transform blocks resolve visibility (e.g., which tile intersects with which surface), the pixel blocks 1012, 1022 may perform the bilinear interpolation discussed herein. Pixel blocks 1012, 1022 interpolate between surface values to produce pixel results using texture information loaded in the memory of controller block 1030. Once the pixel blocks 1012, 1022 determine the color for each pixel of each tile, the display blocks 1013, 1023 adjust and covert the tile data generated by pixel blocks 1012, 1022 into data that is ready to be displayed (e.g., scanline-order data).

In particular embodiments, transform block 1011, 1021 may include a ray caster. In particular embodiments, tiles near the edge of the display screen of the VR or AR headset may require more texel read bandwidth into the pixel blocks 1012, 1022. This is because the chromatic aberration occurring at the edges of the display screen cause the pixels to require approximately three times the amount of data as pixels near the middle of the display. As a result, the ray caster may interleave its cast rays by alternating rays originating from an edge and rays originating from the center of the display. For example, a 2560-pixel screen may be represented by 160 16×16-pixel tiles. The following order of tile reads may be performed: 0, 80, 1, 81, 2, 82, etc. (these numbers represent the order of the tile in a row of 160 tiles).

In particular embodiments, transform block 1011 interfaces with pixel block 1012 and transform block 1021 interfaces with pixel block 1022. Tile data is transferred from the transform block to the pixel block at regular intervals. This data may include tile position and a specified surface with which the projected tile intersects, as determined by the transform blocks 1011 and 1021. The data may also include three bits of information specifying whether to cast rays for each red, blue, green color. Each bit may correspond to a different color: red, green, or blue. A bit that is set to zero indicates that the tile of the color corresponding to that bit does not intersect the surface. As an example and not by way of limitation, the bits may be [010] for RGB, respectively, indicating that a green tile intersects the surface, but the red and blue tiles do not. Other data may be included to aid with processing and other relevant logic. Additional data passed from the transform block to the pixel block may include information related to the aberration adjustment for each color in terms of (u,v) coordinates. For example, this data may look like the following:

RedSharing: This field controls whether separate tile bounds are required for red. The table above provides details related to when RedSharing is enabled. The Red UV values discussed below are ignored by the Pixel Block unless RedSharing is enabled. Redsharing is enabled when the distortion between RGB is above a threshold (e.g., as illustrated by FIG. 9D).

BlueSharing: This field controls whether separate tile bounds are required for blue. The table above provides details related to when BlueSharing is enabled. The Blue U and V values below are ignored by the Pixel Block unless BlueSharing is enabled. Bluesharing is enabled when the distortion between RGB is above a threshold (e.g., as illustrated by FIG. 9D).

RedU: This is the red chromatic aberration adjustment in U, relative to green

RedV: This is the red chromatic aberration adjustment in V, relative to green

BlueU: This is the blue chromatic aberration adjustment in U, relative to green

BlueV: This is the blue chromatic aberration adjustment in V, relative to green

In particular embodiments, a pixel block may take tile/surface pairs from the transform block and schedules bilinear interpolation at the pixel positions within the tiles. The Pixel Block may process the red, green, and blue color components separately. This may be necessary due to chromatic aberration, which in general causes the red, green and blue components of a single display pixel to require different rays and therefore different sample positions. Before scheduling the samples, a buffer manager may load the necessary surface data into buffers within the Filter Blocks by issuing 256-bit reads to the Texture Memory. It may do this by computing the bounding boxes of the red, green, and blue tiles and reading all texels from Texel Memory that are needed by any of the three. If data in a Texel Read is needed by more than one color component, it may load multiple color components in parallel. Where there is little or no chromatic aberration, a single read from Surface Memory loads data into all three Filter Blocks. If the chromatic aberration exceeds a threshold (e.g., 16 pixels), then each of the red, green and blue pixel blocks require separate reads from Surface Memory. In particular embodiments, a tile processing order may interleave tiles from two halves of the tile row. The result may be that edge tiles likely to have high chromatic aberration alternate with center tiles likely to have low chromatic aberration.

Figure 11:
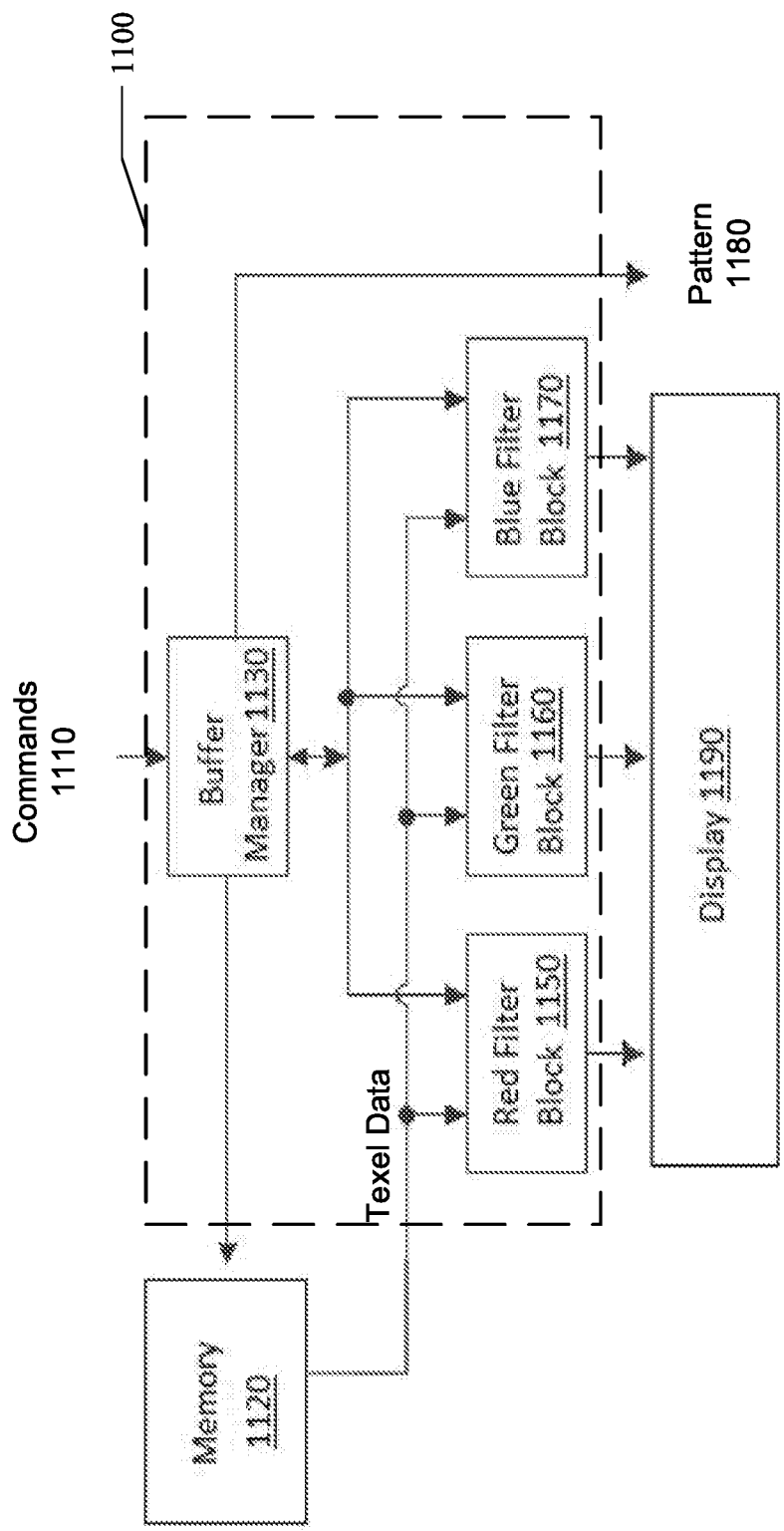
FIG. 11 illustrates an example block diagram for a pixel module.

FIG. 11 illustrates an example block diagram 1100 for a pixel block. The pixel block may include the components within the dotted lines outlining block diagram 1100. The pixel block may receive tile information from the transform block 1011, 1021 and perform bilinear interpolation at the sample positions within each surface. The pixel block may process the red, green, and blue color components separately, due to chromatic aberration as discussed herein. The pixel block may receive commands 1110 from the transform block and access memory 1120 for texel data. The pixel block may include a buffer manager 1130, red filter block 1150, green filter block 1160, and blue filter block 1170. Each of the red filter block 1150, green filter block 1160, and blue filter block 1170 may receive texel data and may perform bilinear interpolations for their respective color samples. The pixel block may output its color computations from the filter blocks 1150, 1160, 1170 to the display block 1190 and output a foveated pattern 1180 associated with the tile. Before scheduling the samples for interpolation, the buffer manager 1130 may load surface data into buffers within each of the color filter blocks 1150, 1160, 1170. Depending on chromatic aberration, a single 256-bit texel memory word may be required by one filter block (e.g., 1150, 1160, or 1170) or multiple filter blocks 1150, 1160, 1170. In the latter case, a single read loads the same data into all filter blocks 1150, 1160, 1170 that require it. If data in a texel read is needed by more than one color component, buffer manager 1130 may load multiple color components in parallel. Where there is little or no chromatic aberration, a single read from memory 1120 loads data into all three Filter Blocks 1150, 1160, and 1170, as discussed above with reference to FIG. 9B. If the chromatic aberration exceeds a predetermined number of pixels (e.g., 16 pixels), then each of the red, green and blue pixel blocks require separate reads from memory 1120, as discussed above with reference to FIG. 9D.

Figure 12:
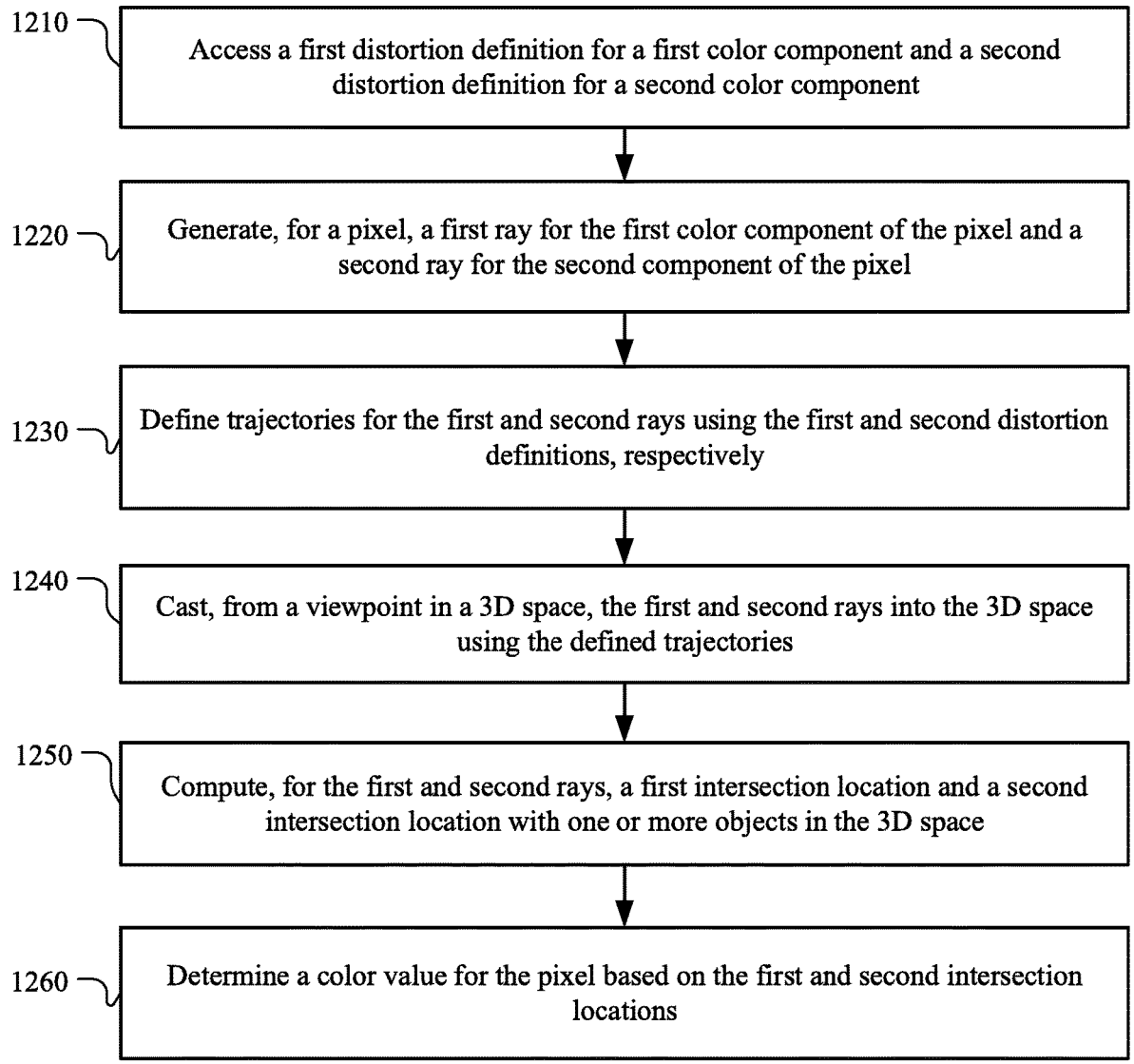
FIG. 12 illustrates an example method for multi-channel ray casting with distortion meshes to address chromatic aberration.

FIG. 12 illustrates an example method 1200 for multi-channel ray casting with distortion meshes to address chromatic aberration. The method may begin at step 1210, where one or more computing systems may access a first distortion definition for a first color component and a second distortion definition for a second color component. In particular embodiments, the first distortion definition and/or the second distortion definition is a distortion mesh, which may include a plurality of mesh coordinates that are respectively associated with a plurality of predetermined points in a screen representation. Each mesh coordinate in the distortion mesh may specify a trajectory for a ray cast from the associated predetermined point into the 3D space. In some embodiments, the first and second distortion definitions may be same (e.g., the first and second color components may be cast through the same distortion mesh). In other embodiments, the first and second distortion definitions may be different (e.g., the first and second color components may be cast through their own distortion meshes).

At step 1220, the one or more computing systems may generate, for a pixel, a first ray for the first color component of the pixel and a second ray for the second component of the pixel. At step 1230, the one or more computing systems may define trajectories for the first and second rays using the first and second distortion definitions, respectively. In particular embodiments, the trajectories defined using the first and second distortion definitions may include offset values by which the first ray for the first color component needs to adjust relative to the second ray for the second color component to minimize effects of chromatic aberration. For example, if relative to green light of RGB channel, chromatic aberration causes red light to shift up by two texels and blue light to shift down by two texels for rays received/cast from a particular pixel, then the computing systems discussed herein may offset the sampling or intersection locations for red light by texels down and may offset the sampling positions for blue light two texels up, so that when the light is observed by the user through an optical lens in a wearable headset (e.g., VR headset), chromatic aberration would be corrected.

At step 1240, the one or more computing systems may cast, from a viewpoint in a 3D space, the first and second rays into the 3D space using the defined trajectories. In particular embodiments, the first and second rays may be cast at different angles to minimize effects of chromatic aberration. At step 1250, the one or more computing systems may compute, for the first and second rays, a first intersection location and a second intersection location with one or more objects in the 3D space. At step 1260, the one or more computing systems may determine a color value for the pixel based on the first and second intersection locations. In particular embodiments, the one or more computing system may determine visibility of the one or more objects in the 3D space based on the first and second rays intersecting at the first and second intersection locations, respectively. In particular embodiments, once the color value for the pixel and color values for other pixels in a similar manner are determined, a display may be generated for a wearable headset. The wearable headset may be a virtual reality (VR) headset or an augmented reality (AR) headset. In some embodiments, the wearable headset may include one or more optics for eye of a wearer. For example, the optics may include a pair of optical lenses located between the wearer's eye and a display screen of the wearable headset. As discussed elsewhere herein, effects of chromatic aberration may be maximum at edges of the optics and minimal at the center of the optics. In particular embodiments, the first and the second distortion definitions described herein may be used to correct the effects of chromatic aberration resulting from these optics of the wearable headset.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for multi-channel ray casting with distortion meshes to address chromatic aberration including the particular steps of the method of FIG. 12, this disclosure contemplates any suitable method for multi-channel ray casting with distortion meshes to address chromatic aberration including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
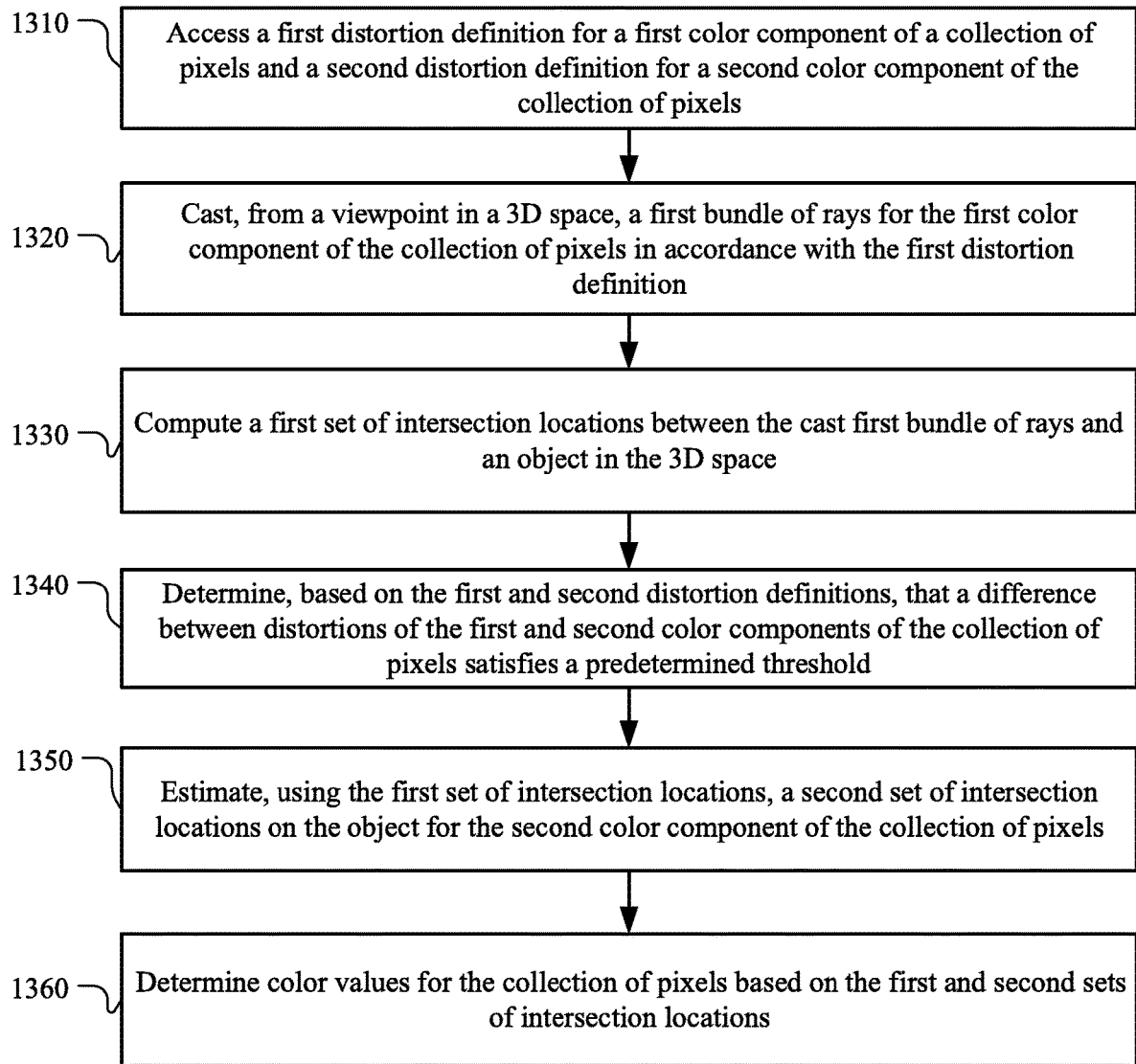
FIG. 13 illustrates an example method for performing optimizations to reduce multi-channel ray casting for color sampling.

FIG. 13 illustrates an example method 1300 for performing optimizations to reduce multi-channel ray casting for color sampling. The method may begin at step 1310, where one or more computing systems may access a first distortion definition for a first color component of a collection of pixels and a second distortion definition for a second color component of the collection of pixels. In some embodiments, the first and second distortion definitions may be same. In other embodiments, the first and second distortion definitions may be different. At step 1320, the one or more computing systems may cast, from a viewpoint in a 3D space, a first bundle of rays for the first color component of the collection of pixels in accordance with the first distortion definition. For example, one or more rays for red color component 621 of the RGB channel may be cast through a distortion mesh 630, as shown and discussed with respect to FIG. 6. The first bundle of rays for the first color component may be cast through a center of a pixel footprint at a first hierarchy level (e.g., as shown and discussed in FIGS. 1 and 2), a tile including a set of pixel footprints, where the tile is defined at a second hierarchy level (e.g., as shown and discussed in FIGS. 1 and 3), or a block including a set of tiles, where the block is defined at a third-hierarchy level (e.g., as shown and discussed in FIGS. 1 and 4).

At step 1330, the one or more computing systems may compute a first set of intersection locations between the cast first bundle of rays and an object in the 3D space. As an example, the one or more computing systems may compute an intersection location 651 between the red ray 621 and image surface 650 in 3D space, as shown in FIG. 6. At step 1340, the one or more computing systems may determine, based on the first and second distortion definitions, that a difference between distortions of the first and second color components of the collection of pixels satisfies a predetermined threshold.

At step 1350, the one or more computing systems may estimate, using the first set of intersection locations, a second set of intersection locations on the object for the second color component of the collection of pixels. In some embodiments, estimating the second set of intersection locations for the second color component may include determining the second set of intersection locations as being equivalent or substantially similar to the first set of intersection locations for the first color component. For example, as shown and discussed with respect to FIG. 9B, if the difference between the distortions of the first and second color components (e.g., minor offsets between red and green color components due to distortion) is less than a predetermined threshold, then the same set of intersection locations for a particular color component (e.g., red) may be used to estimate the intersection locations for other color components, such as green and blue. In some embodiments, estimating the second set of intersection locations for the second color component may include determining the second set of intersection locations based on shifting the first set of intersection locations by predetermined offset values as defined in one or more of the first or second distortion definitions. For example, as shown and discussed above with respect to FIG. 9C, if the difference between the distortions of the first and second color components is greater than the predetermined threshold but less than a second predetermined threshold, then the intersection locations for other color components, such as green and blue, may be estimated simply by shifting the sampling/intersection locations of red by some offset values. If in case the difference between distortions of first and second color components is even larger than the second predetermined threshold, then individual rays need to be cast for each color component and intersection locations for each color may be separately determined, as discussed above with respect to at least FIG. 9D. In particular embodiments, the one or more computing systems discussed herein may be further capable of estimating a third set of intersection locations on the object for a third color component of the collection of pixels using the first set of intersection locations. Estimating the second and/or third intersection locations for the second and third color components using the first intersection locations is advantageous as this may be done without casting individual rays for each color component, which helps in minimizing overall computational load and processing time on the one or more computer systems.

At step 1360, the one or more computing systems may determine color values for the collection of pixels based on the first and second sets of intersection locations. In particular embodiments, once the color values for the collection of pixels are determined, a display may be generated for a wearable headset. The wearable headset may be a VR headset or an AR headset as discussed elsewhere herein. In particular embodiments, the first and the second distortion definitions described herein may be used to correct effects of chromatic aberration resulting from one or more optics of the wearable headset.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for performing optimizations to reduce multi-channel ray casting for color sampling including the particular steps of the method of FIG. 13, this disclosure contemplates any suitable method for performing optimizations to reduce multi-channel ray casting for color sampling including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
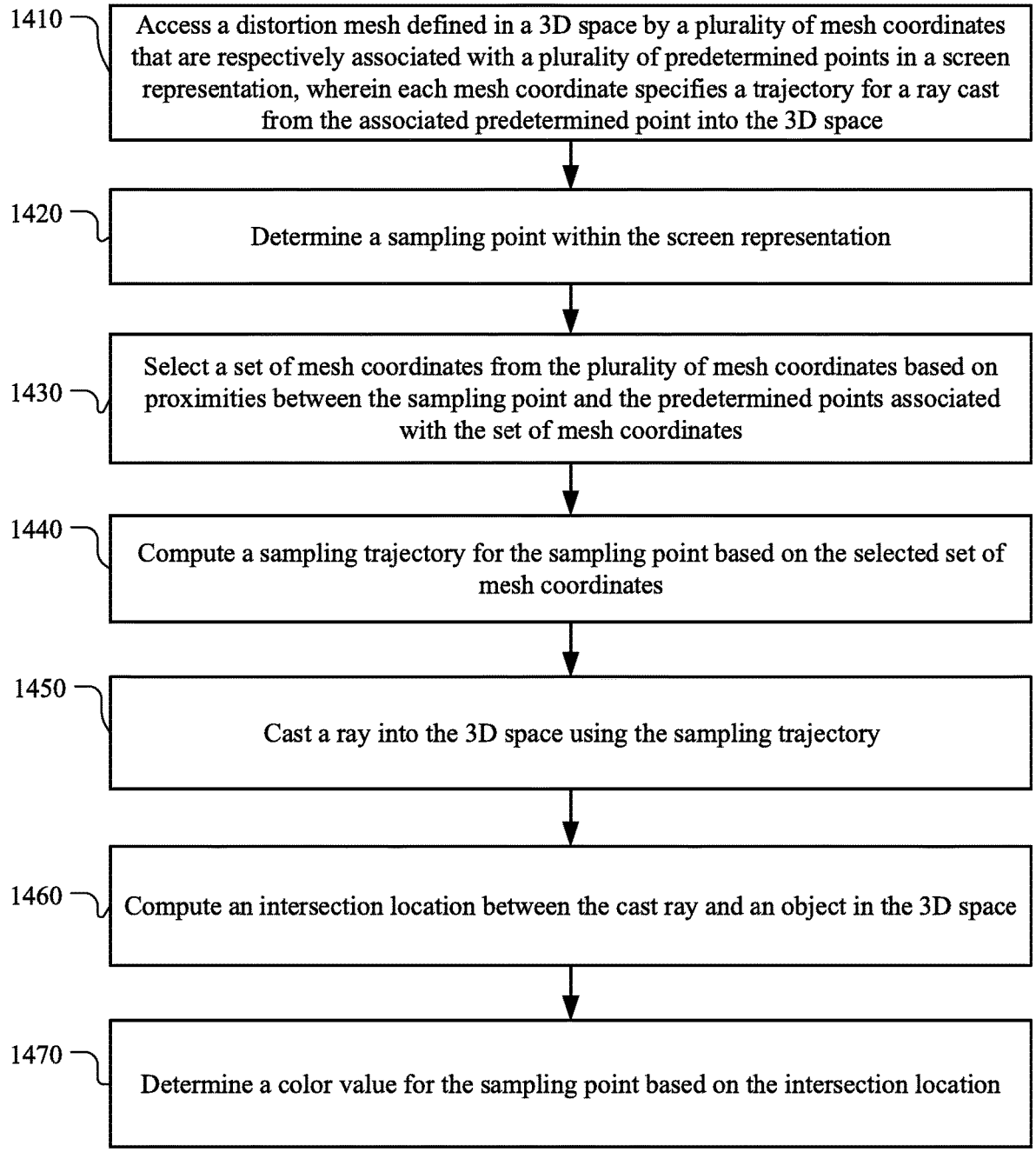
FIG. 14 illustrates an example method for computing ray trajectories for pixels using interpolation.

FIG. 14 illustrates an example method 1400 for computing ray trajectories for pixels using interpolation. The method 1400 covers one particular embodiment of an interpolation technique to define ray trajectories for a distortion mesh. Generally, the distortion mesh may not define trajectories for every pixel whose color needs to be sampled. For example, if there are 100 pixels (e.g., 10×10 virtual image array), the distortion mesh might only have a coarse mesh of 20 points. Each point on the mesh might explicitly indicate how a ray should be cast from a corresponding pixel. For a given pixel without an explicit mesh coordinate (i.e., the 80 remaining pixels whose trajectories are not defined in the distortion mesh), the method 1400 may find a particular number of nearest pixels (e.g., four nearest pixels) with defined mesh coordinates and interpolate to find a point on the distortion mesh through which the ray for the given pixel should be cast, as discussed in further detail below. It should be understood that other embodiments of using interpolation for other purposes, such as texture or color sampling, as discussed elsewhere herein are contemplated and within the scope of the present disclosure.

The method 1400 may begin at step 1410, where one or more computing systems may access a distortion mesh defined in a 3D space by a plurality of mesh coordinates that are respectively associated with a plurality of predetermined points in a screen representation, wherein each mesh coordinate specifies a trajectory for a ray cast from the associated predetermined point into the 3D space. At step 1420, the one or more computing systems may determine a sampling point within the screen representation. At step 1430, the one or more computing systems may select a set of mesh coordinates from the plurality of mesh coordinates based on proximities between the sampling point and the predetermined points associated with the set of mesh coordinates. At step 1440, the one or more computing systems may compute a sampling trajectory for the sampling point based on the selected set of mesh coordinates. In particular embodiments, computing the sampling trajectory for the sampling point may include estimating a mesh coordinate through which to cast the ray into the 3D space based on interpolation of the selected set of mesh coordinates using a particular interpolation technique. The particular interpolation technique may include a bilinear interpolation or a bicubic interpolation.

At step 1450, the one or more computing systems may cast a ray into the 3D space using the sampling trajectory. At step 1460, the one or more computing systems may compute an intersection location between the cast ray and an object in the 3D space. At step 1470, the one or more computing systems may determine a color value for the sampling point based on the intersection location. In particular embodiments, determining the color value for the sampling point may include transforming the intersection location of the cast ray from the 3D space into a texture grid (e.g., see FIG. 7) and then calculating, using a particular interpolation technique, the color value based on interpolation of neighboring texels surrounding the intersection location. The texels may be included in a texture grid (e.g., as shown and discussed with respect to FIG. 7), where each texel may reflect color and transparency information for a particular color. As mentioned earlier, the particular interpolation technique may be a bilinear or a bicubic interpolation. In particular embodiments, once the color value for the sampling point and other sampling points is determined, a display may be generated for a wearable headset. The wearable headset may be a VR headset or an AR headset. In particular embodiments, the distortion mesh discussed herein may be used to correct effects of chromatic aberration resulting from one or more optics of the wearable headset.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for computing ray trajectories for pixels using interpolation including the particular steps of the method of FIG. 14, this disclosure contemplates any suitable method for computing ray trajectories for pixels using interpolation including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Figure 15:
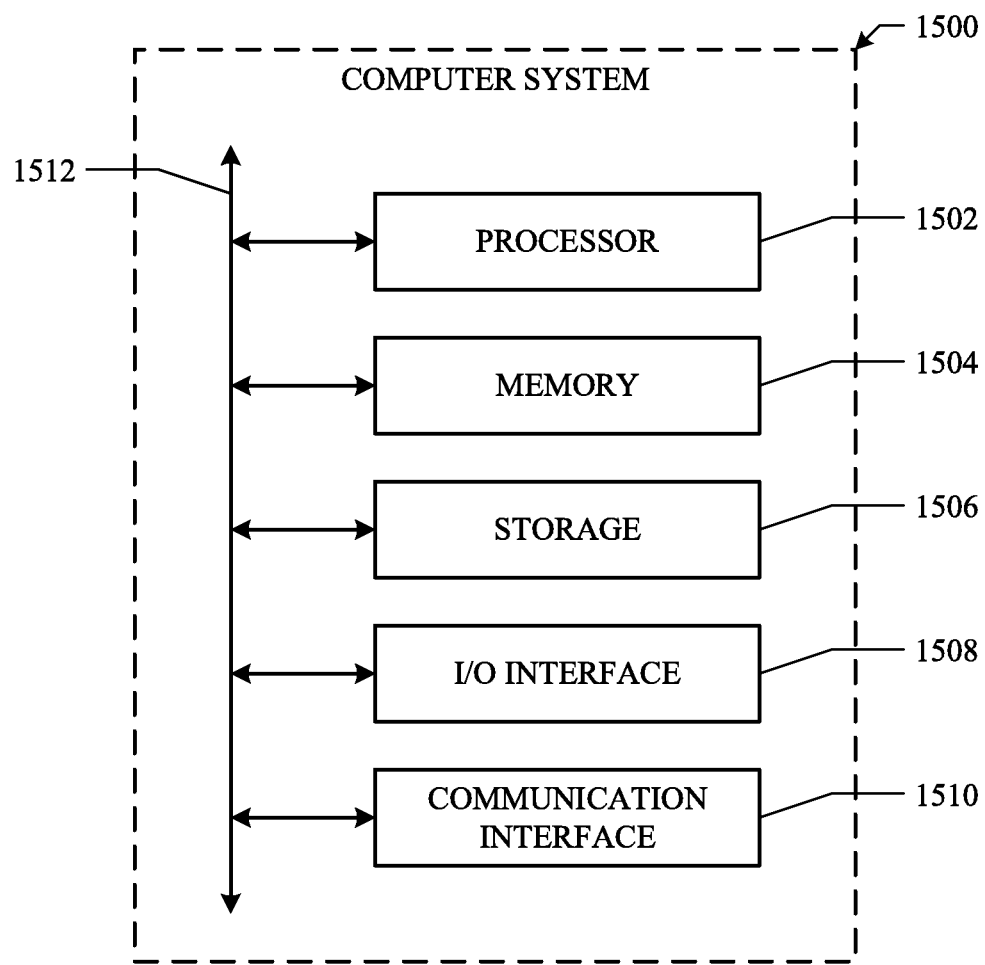
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real-time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computer systems:
    accessing a first distortion definition for a first color component of a collection of pixels and a second distortion definition for a second color component of the collection of pixels;
    casting, from a viewpoint in a 3D space, a first bundle of rays for the first color component of the collection of pixels in accordance with the first distortion definition;
    computing a first set of intersection locations between the cast first bundle of rays and an object in the 3D space;
    determining, based on the first and second distortion definitions, that a difference between a degree of distortion of the first color component and a degree of distortion of the second color component is less than a predetermined threshold;
    in response to the determining that the difference is less than the predetermined threshold, estimating, using the first set of intersection locations associated with the first color component, a second set of intersection locations on the object for the second color component of the collection of pixels; and
    determining color values for the collection of pixels based on the first and second sets of intersection locations.

2. The method of claim 1, wherein estimating the second set of intersection locations comprises:
determining the second set of intersection locations on the object for the second color component as equivalent to the first set of intersection locations.

3. The method of claim 1, wherein estimating the second set of intersection locations comprises:
determining the second set of intersection locations on the object for the second color component based on shifting the first set of intersection locations by predetermined offset values as defined in one or more of the first or second distortion definitions.

4. The method of claim 1, wherein the second set of intersection locations for the second color component are estimated without casting a second bundle of rays for the second color component into the 3D space.

5. The method of claim 1, further comprising:
estimating, using the first set of intersection locations, a third set of intersection locations on the object for a third color component of the collection of pixels.

6. The method of claim 1, further comprising:
generating a display for a wearable headset based on the determined color values for the collection of pixels.

7. The method of claim 6, wherein the wearable headset is a virtual reality (VR) headset or an augmented reality (AR) headset.

8. The method of claim 6, wherein the first and second distortion definitions are used to correct effects of chromatic aberration resulting from one or more optics of the wearable headset.

9. The method of claim 1, wherein the first and second distortion definitions are same.

10. The method of claim 1, wherein the first and second distortion definitions are different.

11. One or more computer-readable non-transitory storage media embodying software that is operable when executed to:
access a first distortion definition for a first color component of a collection of pixels and a second distortion definition for a second color component of the collection of pixels;
cast, from a viewpoint in a 3D space, a first bundle of rays for the first color component of the collection of pixels in accordance with the first distortion definition;
compute a first set of intersection locations between the cast first bundle of rays and an object in the 3D space;
determine, based on the first and second distortion definitions, that a difference between a degree of distortion of the first color component and a degree of distortion of the second color component is less than a predetermined threshold;
in response to the determining that the difference is less than the predetermined threshold, estimate, using the first set of intersection locations associated with the first color component, a second set of intersection locations on the object for the second color component of the collection of pixels; and
determine color values for the collection of pixels based on the first and second sets of intersection locations.

12. The media of claim 11, wherein to estimate the second set of intersection locations, the software is further operable to:
determine the second set of intersection locations on the object for the second color component as equivalent to the first set of intersection locations.

13. The media of claim 11, wherein to estimate the second set of intersection locations, the software is further operable to:
determine the second set of intersection locations on the object for the second color component based on shifting the first set of intersection locations by predetermined offset values as defined in one or more of the first or second distortion definitions.

14. The media of claim 11, wherein the second set of intersection locations for the second color component are estimated without casting a second bundle of rays for the second color component into the 3D space.

15. The media of claim 11, wherein the software is further operable to:
estimate, using the first set of intersection locations, a third set of intersection locations on the object for a third color component of the collection of pixels.

16. A system comprising: one or more processors; and a non-transitory memory coupled to the processors comprising instructions executable by the processors, the processors operable when executing the instructions to:
access a first distortion definition for a first color component of a collection of pixels and a second distortion definition for a second color component of the collection of pixels;
cast, from a viewpoint in a 3D space, a first bundle of rays for the first color component of the collection of pixels in accordance with the first distortion definition;
compute a first set of intersection locations between the cast first bundle of rays and an object in the 3D space;
determine, based on the first and second distortion definitions, that a difference between a degree of distortion of the first color component and a degree of distortion of the second color component is less than a predetermined threshold;
in response to the determining that the difference is less than the predetermined threshold, estimate, using the first set of intersection locations associated with the first color component, a second set of intersection locations on the object for the second color component of the collection of pixels; and
determine color values for the collection of pixels based on the first and second sets of intersection locations.

17. The system of claim 16, wherein to estimate the second set of intersection locations, the processors are further operable to:
determine the second set of intersection locations on the object for the second color component as equivalent to the first set of intersection locations.

18. The system of claim 16, wherein to estimate the second set of intersection locations, the processors are further operable to:
determine the second set of intersection locations on the object for the second color component based on shifting the first set of intersection locations by predetermined offset values as defined in one or more of the first or second distortion definitions.

19. The system of claim 16, wherein the second set of intersection locations for the second color component are estimated without casting a second bundle of rays for the second color component into the 3D space.

20. The system of claim 16, wherein the processors are further operable to: estimate, using the first set of intersection locations, a third set of intersection locations on the object for a third color component of the collection of pixels.

* * * * *